(12) United States Patent
Bruning et al.

(10) Patent No.: US 6,620,357 B2
(45) Date of Patent: Sep. 16, 2003

(54) METHOD FOR PRODUCING A PRODUCT COMPRISING PLASTIC FOAM IN AN AUTOMATIC MOLDING MACHINE

(75) Inventors: Jürgen Bruning, Ohrdruf (DE); Eberhard Lang, Ohrdruf (DE)

(73) Assignee: Gefinex Polymerschaume GmbH, Steinhagen (DE)

(*) Notice: Subject to any disclaimer, the term of this patent is extended or adjusted under 35 U.S.C. 154(b) by 157 days.

(21) Appl. No.: 09/933,257

(22) Filed: Aug. 20, 2001

(65) Prior Publication Data

US 2002/0047225 A1 Apr. 25, 2002

Related U.S. Application Data

(63) Continuation-in-part of application No. PCT/EP00/01392, filed on Feb. 21, 2000.

(30) Foreign Application Priority Data

Feb. 21, 1999 (DE) .......................... 199 07 279

(51) Int. Cl.[7] .............................................. B29C 44/06
(52) U.S. Cl. .................... 264/45.4; 264/257; 264/258; 264/102
(58) Field of Search ............................. 264/45.4, 257, 264/258, 102

(56) References Cited

U.S. PATENT DOCUMENTS

| | | | |
|---|---|---|---|
| 4,264,544 A | 4/1981 | Wilheim | 264/45.5 |
| 4,430,286 A | * 2/1984 | Franz | 264/258 |
| 4,681,724 A | * 7/1987 | Faiz et al. | 264/257 |
| 4,818,580 A | * 4/1989 | Bottger et al. | 428/113 |
| 5,242,637 A | * 9/1993 | Inoue et al. | 264/45.3 |
| 5,565,154 A | * 10/1996 | McGregor et al. | 264/45.4 |
| 5,792,398 A | * 8/1998 | Andersson | 264/45.4 |

FOREIGN PATENT DOCUMENTS

| | | |
|---|---|---|
| EP | 0664313 | 7/1995 |
| FR | 2772300 | 6/1999 |
| WO | 9508433 | 3/1995 |

* cited by examiner

Primary Examiner—Allan R. Kuhns
(74) Attorney, Agent, or Firm—Nils H. Ljungman & Associates

(57) ABSTRACT

There is now provided a method for producing a product comprising plastic foam in an automatic molding machine. The method comprises providing a woven fabric on at least one surface of the mold cavity, with the woven fabric comprising a fabric having a fine-mesh woven fabric ply that faces the interior of the mold cavity upon assembly and a coarse-mesh woven fabric ply that is disposed adjacent at least one surface of the mold cavity and beneath the fine-mesh woven ply upon assembly to support the fine-mesh woven ply. The method further provides for introducing beads comprising plastic foam into the mold cavity; contacting the beads with a gaseous heat transfer medium, such as superheated steam; introducing the gaseous heat transfer medium into the mold cavity; flowing the gaseous heat transfer medium along a first surface of the mold cavity; and removing gaseous heat transfer medium along a second surface of the mold cavity; and removing the finished product from the mold.

20 Claims, 16 Drawing Sheets

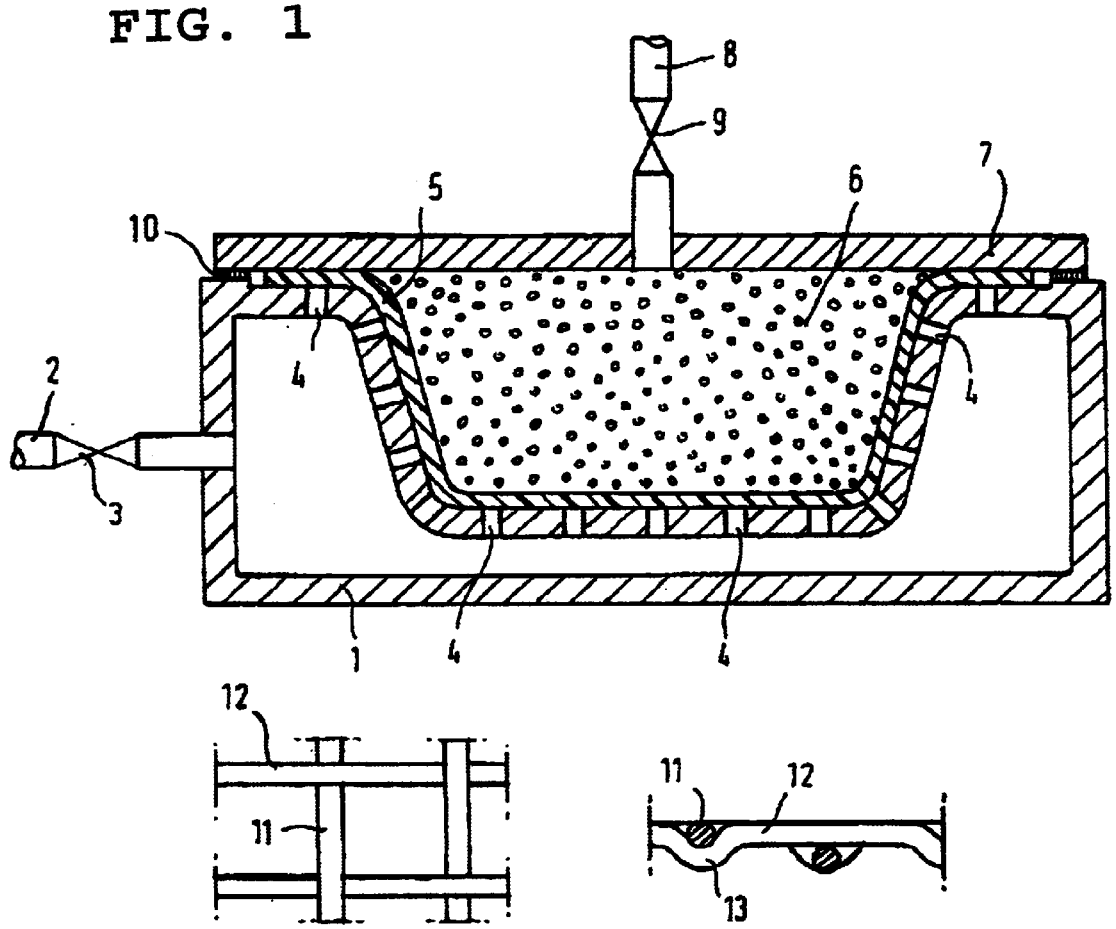
FIG. 1
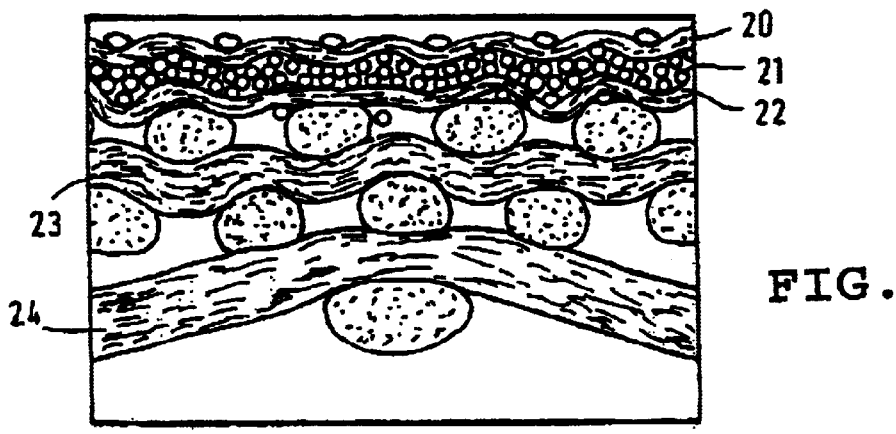
FIG. 2
FIG. 3
FIG. 4

US 6,620,357 B2

METHOD FOR PRODUCING A PRODUCT COMPRISING PLASTIC FOAM IN AN AUTOMATIC MOLDING MACHINE

CONTINUING APPLICATION DATA

This application is a Continuation-in-Part of International Application No. PCT/EP00/01392, filed on Feb. 21, 2000, which claims priority from Federal Republic of Germany Patent Application No. 199 07 279.5, filed on Feb. 21, 1999. International Application No. PCT/EP00/01392 was pending as of the filing of this application. The United States was an elected state in International Application No. PCT/EP00/01392.

BACKGROUND OF THE INVENTION

1. Field of the Invention

The invention relates to a method for producing a product comprising plastic foam in an automatic molding machine.

2. Background Information

Beads are foam particles of small dimensions. Various plastics can be employed in this context, e.g. polystyrene (PS), polyethylene (PE) or polypropylene (PP). The following area of application is envisaged in European Patent No. EP 0664313 of Sep. 9, 1998, for example: polypropylene as well as ethylene and propylene copolymers, comonomers, e.g. alpha alkenes such as propylene, butene, pentene, hexene, octene; furthermore vinyl esters such as vinyl acetate, acrylic acid esters, methacrylic acid esters, maleic acid esters or fumaric acid esters of alcohols.

The beads can have a spherical or some other shape, e.g. a cylindrical shape. The shapes of the beads are determined in part by the way in which they are produced. Irrespective of their shape, the bead diameter is generally used to define the size of the beads. Diameters of 0.5 to 6 millimeters are customary. This does not exclude smaller or larger beads.

A fundamental distinction is drawn, in producing beads, between production in an autoclave and production by extrusion. After production, the beads are held in silos or in some other suitable way before being used.

The beads are joined together in a mold, referred to as an automatic molding machine. This is accomplished by heating the beads at the surfaces until there is a greater or lesser degree of softening, and by compression. Given sufficient melting of the surface and pressure, the beads weld together. Adequate bonding/sintering may occur with less melting and a lower pressure.

Heating not only causes melting of the surface but also expansion. The expansion depends on the type and amount of gas trapped in the beads. The expansion contributes to the build-up of pressure.

Otherwise, the pressure is normally built up by virtue of the fact that the beads are fed into the mold cavity of the automatic molding machine under pressure and that the cavity is completely filled. Even if the mold is ventilated after filling, the beads introduced remain under pressure because the beads compressed by the filling pressure cannot expand in the mold cavity.

A gaseous medium, in particular conveying air, is suitable for feeding in the beads. Conveying air is available in unlimited supply. One blower is sufficient for producing conveying air. The blower draws in ambient air and forces this air through a pipe into the mold cavity of the automatic molding machine. On the way to the mold cavity, the conveying air draws the desired quantity of beads out of a silo, preferably from the bottom.

In the mold cavity, the beads are separated from the conveying air. While the conveying air is supposed to flow into the mold cavity and then back out of the mold, the beads are supposed to remain in the mold cavity. The beads are retained in the automatic molding machine because the exhaust-air opening is of appropriately narrow configuration. That is to say, the diameter of the exhaust-air opening is smaller than the diameter of the beads. In order, at the same time, to allow a relatively large conveying air rate, it is customary to provide a plurality of exhaust-air openings. In practice, it is customary to distribute a multiplicity of openings over the inflow area of the automatic molding machine. EP 0664313 describes an automatic molding machine of this kind. Here, a perforated mold is referred to. That is to say there are a sufficient number of openings to allow the use of the term "perforated surface".

Once sufficient filling has been achieved, the feed opening of the mold is closed. Superheated steam is then blown through corresponding nozzles into the mold cavity. The superheated steam flows between the beads to the opposite side of the mold cavity and flows out there, like the conveying air before it. During this process, the superheated steam displaces the air which remains between the beads and heats up the surface of the beads. The steam pressure is chosen so that it will overcome the flow resistance of the beads in the mold cavity. The temperature of the steam is furthermore chosen so that within a steam application time (generally up to five minutes) the beads are heated and melt at the surface to an extent such that the bead pressure leads to welding of the beads at the contact surfaces. The necessary pressure is brought about by the pressure filling of the mold cavity and/or by the pressure of the superheated steam and/or by the heating and associated expansion of the beads. The surface temperature of the beads should exceed the so-called glass transition temperature but should remain below the melting temperature of the plastic.

During the process, the openings in the mold are generally replicated on the surface of the moldings produced.

EP 0664313 proposes a concept by means of which replication of the openings is avoided. In this case, a woven wire fabric or a perforated plate is placed against at least one mold wall on the inside, its thickness being 0.2 to 5, preferably 0.5 to 2, millimeters. Metal, such as aluminium or stainless steel, or temperature-stable plastic is to be used as the material for the wire or plate. The woven wire fabric or perforated plate are to be laid loosely in the mold, pressed in, fastened by means of clips or screws or spot-brazed or-spot-welded in. As is customary, the walls of the mold can be provided uniformly with perforations, allowing the superheated steam to spray the interior of the mold uniformly. Since a certain clearance is produced between the surface of the molding and the inner wall of the mold by the inserts, the nozzles cannot be copied on the surface of the molding. On the other hand, the particles resting on the surface are pressed partially into the holes in the fabric or plate, with the result that their structure is impressed upon the surface of the molding. The result is that, instead of receiving irregular impressions, it has essentially a completely regular structure imparted to it.

Structured surfaces are not always advantageous. In the food industry, for example, smooth, easily cleaned surfaces are required for reasons of hygiene. The moldings and automatic molding machines known from EP 0664313 cannot achieve this.

OBJECT OF THE INVENTION

The object on which the invention is based is to improve the surface finish. In this context, the invention sees a conceptual starting-point in the woven fabric lining of the mold or automatic molding machine of the type disclosed by EP 0664313 and also known from earlier publications, even though an unwanted surface structure is produced there.

SUMMARY OF THE INVENTION

The invention teaches that this object can be accomplished by a method for producing a product comprising plastic foam in an automatic molding machine with a mold cavity in conformity with the configuration of the product, said method comprising the steps of: providing a woven fabric on at least one surface of said mold cavity, said woven fabric comprising a fabric having a plurality of plies, with a fine-mesh woven fabric ply that faces the interior of said mold cavity upon assembly and a coarse-mesh woven fabric ply that is disposed adjacent said at least one surface of said mold cavity and beneath said fine-mesh woven ply upon assembly to support said fine-mesh woven ply; introducing beads comprising plastic foam into said mold cavity; contacting said beads with a gaseous heat transfer medium, such as superheated steam; said step of contacting comprising: introducing said gaseous heat transfer medium into the mold cavity; flowing said gaseous heat transfer medium along a first surface of said mold cavity; and removing said gaseous heat transfer medium along a second surface of said mold cavity; and removing the product from the mold.

According to the invention, in accordance with one aspect, the desired smooth surface structure is achieved with the aid of a lining comprising a plurality of interconnected woven fabric plies, the foam side of which has a small mesh width, which is selected as a function of the beads being processed and is no longer reproduced as a structure on the surface of the molding. There can also be a plurality of woven fabric plies with a fine mesh width on the foam side.

The use of a woven fabric is admittedly known per se from International Patent Application WO 95/08433 with International Application No. PCT/DE94/01096 filed on Sep. 21, 1994. However, a single-ply woven fabric is not well suited to bringing about the required distribution of the steam. For this reason, the fabric in line with this proposal is given an inherently functional shape as an additional structural feature.

The woven fabric structure used according to the invention on the foam side (referred to below simply as a woven fabric ply on the foam side) is supported by one or more coarser woven fabric plies.

The woven fabric used according to the invention can be composed of metal wires and/or non-metallic threads and the like.

Pleasingly smooth surfaces can surprisingly already be obtained when the mesh width of the woven fabric ply on the foam side is less than half the diameter of the beads employed.

In the application to moldings for the food sector or the like applications with a similar or even higher standard of hygiene, smaller mesh widths are envisaged for the woven fabric ply on the foam side, e.g. 0.001 to 0.5 millimeters, preferably 0.005 to 0.2 millimeters, in the case of beads with a diameter of 3 to 5 millimeters. In the case of other beads, similar (appropriate) limits can be determined by a small number of tests.

Operating automatic molding machines with woven fabrics of this kind used according to the invention also provides another surprise: the boundaries of the beads which were otherwise visible on the surface of moldings produced from foam particles disappear. The surface is even better for various applications, e.g. is easier to clean and also better for application of laminating foils.

The visible boundaries between the beads indicate that the beads have not welded together completely. In severe cases, the beads can be detached easily from the surface of the molding. This is a troublesome phenomenon which is familiar from conventional polystyrene moldings for packaging. The invention attributes this to the fact that some of the water condenses out of the superheated steam onto the metal walls of the mold cavities and remains between the beads in conventional automatic molding machines. This is to be attributed to the fact that the temperature at the walls of the automatic molding machines in the case of conventional molds is significantly below the temperature of the steam, e.g. 80 degrees Celsius during steam treatment. In contrast, the steam is at a temperature of about 120 degrees Celsius and about 1.2 bar, a bar being a unit of pressure or stress, is equal to $10^5$ newton per square meters, even when processing polystyrene. In the case of PP, the difference is even more critical. In this process, steam at about 170 degrees Celsius and 4 to 6 bar is required. As the difference in temperature increases, higher levels of condensate formation must also be expected. In the mold, the water acts as a parting agent between the beads.

It is only the multi-ply woven fabric layers used according to the invention which prevent the occurrence of condensate. The invention attributes this to the following factors: firstly, the woven fabric used according to the invention is extremely good for carrying away superheated steam and condensate compared with other known automatic molding machines. Secondly, the woven fabric used according to the invention has a very low heat absorption compared with conventional devices, with the result that the woven fabric used according to the invention heats up quickly. This applies particularly to the decisive area of contact with the foam. Once the contact surfaces are heated up, there is no longer any risk of condensate formation.

Insofar as condensate formation occurs on the woven fabric ply on the foam side when superheated steam is applied, the condensate is carried along and discharged by the superheated steam flowing in behind.

Condensate which forms along the path of the superheated steam from the woven fabric ply on the foam side to the outlet from the automatic molding machine is optionally extracted by the application of a vacuum on completion of treatment with superheated steam.

It is generally sufficient to set up a steam chamber in the exhaust-steam section (path for the exiting superheated steam) and to apply the vacuum there.

The permeability according to the invention of the woven fabric used can be determined from the flow resistance. The studies depicted in FIGS. 5 and 6 were carried out a) in the case of FIG. 5, at an outside temperature of 22 degrees Celsius, an atmospheric pressure of 988 mbar [1 millibar being equal to 100 newtons per square meter] and with a test piece diameter of 100 millimeters, and b) in the case of FIG. 6, at an outside temperature of 23 degrees Celsius, an atmospheric pressure of 1018 mbar and with a test piece diameter of 100 millimeters.

The woven fabric used according to the invention and shown in FIG. 5 has a total of 4 plies with a woven fabric ply on the foam side with a mesh width of 0.005 millimeters.

The woven fabric used according to the invention and shown in FIG. 6 likewise has 4 plies with a woven fabric ply on the foam side with a mesh width of 0.14 millimeters.

The woven fabric used according to the invention allows significantly more intense cooling than in the case of conventional automatic molding machines.

Fundamental advantages in terms of cooling are obtained by virtue of the fact that the mass of the woven fabric used according to the invention is significantly lower than that of comparable systems.

Moreover, cooling of the woven fabric used according to the invention and of outer layers of the molding formed can be achieved very quickly by blowing in cooling air, for example. The outer layers of the molding formed determine its dimensions.

The woven fabrics used according to the invention are also suitable for the application of some other coolant. The coolant can also be water. Particularly good conditions can be obtained by spraying the resulting molding with cooling water.

During initial cooling, the moldings must remain in the automatic molding machine. The cooling time has a significant influence on the cycle time of manufacture. Cooling in accordance with the invention allows the cycle time to be reduced accordingly.

The production cycle ends with ejection of the moldings formed from the automatic molding machine. The surfaces which determine the shape should then be at a temperature below the glass transition point. In the case of polystyrene, the ejection temperature is 40 to 90 degrees Celsius and, in the case of PP; it is 70 to 100 degrees Celsius.

The smooth woven fabric surface according to the invention is advantageously also favourable for mold release.

The thread and wire diameter is generally obtained from the mesh width. It is also possible to make a free selection of the thread and wire thickness/diameter as a function of the mesh width when designing the woven fabric plies used according to the invention. It is advantageous if the thread and wire thickness/diameter of the woven fabric ply on the foam side is equal to or less than 10 times the mesh width. Even greater advantages as regards the surface and as regards permeability to air and steam are obtained if the thread and wire thickness/diameter is equal to or less than five times the mesh width. It is also possible to consider threads and wires with a thickness/diameter which is equal to or less than the mesh width.

According to the invention, the woven fabric ply on the foam side is supported by a coarser woven supporting structure which overall has a larger mesh width, preferably 1.5 to 20 times the mesh width, and a larger thread and wire thickness, preferably also 1.5 to 20 times the thread and wire thickness in the woven fabric ply/woven fabric structure on the foam side. Good flow conditions are obtained in the woven fabric used according to the invention especially if:

a) the mesh width of the woven supporting structure is greater than the mesh width of the ply on the foam side plus 2.5 times the thread or wire thickness of the ply on the foam side, and/or b) the woven fabric plies used according to the invention are inserted in such a way as regards their direction of weaving that the directions of weaving of two adjacent woven fabric plies differ by 90 degrees.

Weaving is defined by the warp and weft threads or warp and weft wires. This results in strip stock. The longitudinal direction of the strip is referred to below as the weaving direction.

The weaving direction remains the same even if lengths are cut or sections cut out of a strip of fabric for the woven fabric used according to the invention. The weaving direction can be identified from the warp and weft threads or warp and weft wires. The distinction is easy to make because the warp and weft can be distinguished in the woven fabric. To achieve the offset of 90 degrees in accordance with the invention, care must merely be taken to ensure that the threads or wires which have been worked in the same way in two adjacent woven fabric plies used according to the invention cross one another. A 90-degree offset results in exactly perpendicular crossing.

However, crossing at an angle can also be performed.

Where there are more than two woven fabric plies used according to the invention, the above conditions preferably apply in relation to the respective woven fabric plies used according to the invention resting upon one another. The respective smaller dimensions relate to the woven fabric ply used according to the invention that is closer to the foam. Individual fine-mesh plies in the woven fabric structure on the foam side and individual coarse-mesh plies in the woven supporting structure can optionally be repeated.

Three or more woven fabric plies are advantageous for the woven fabric used according to the invention. Superheated steam can be distributed in an excellent manner in the woven fabric used according to the invention through the coarser woven fabric plies used according to the invention.

The metallic woven fabric plies used according to the invention can be welded to one another. Induction welding is advantageous in this context. Induction welding can be monitored very well, and there is therefore essentially no risk that individual wires will be burnt through. Metallic woven fabric plies used according to the invention can also be sintered together. Sintering is similar to welding. The contact surfaces are heated and pressed together. While heating is significantly more intense in the case of welding than sintering, the pressure involved in welding is significantly lower than in the case of sintering. Brazing of the metallic woven fabric plies used according to the invention is furthermore worth considering. All the woven fabric plies used according to the invention can be bonded or held in the desired shape and position with fastening or clamping elements. Various means, e.g. screws or rivets, are suitable as fastening or clamping elements.

Non-metallic woven fabric plies used according to the invention can be composed of carbon fibers, for example. Carbon fibers have a high strength and low thermal conductivity. It can be advantageous to combine metallic woven fabric plies used according to the invention with non-metallic woven fabric plies used according to the invention. Metallic woven fabric plies used according to the invention especially are suitable for fastening by means of pressing or crimping.

The woven fabrics used according to the invention can be prepared as a composite material and inserted into the mold. It is also possible to delay connecting the woven fabric plies used according to the invention until they are in the mold. Although connection of the woven fabric plies used according to the invention over a partial area and/or connection of the woven fabric used according to the invention over a partial area with the walls of the automatic molding machine which lie behind it is possible, connection over the full area can provide advantages.

Surprisingly, the formation of condensate from the superheated steam on the outflow side when woven fabrics used according to the invention are used in accordance with the invention is very much less than in conventional automatic molding machines. The formation of condensate likewise impairs the quality of the products. The invention also improves cycle times. These can be shortened. In the case of moldings which are 100 millimeters thick, cycle times of 2 to 5 minutes are easily possible.

Woven wire fabrics made of steel, especially with alloying components such as chromium, nickel and molybdenum which result in high-grade steel, are favorable.

The total thickness of the woven fabric layer used according to the invention can be affected by the required air/steam flow and/or by stability considerations. The thicker the threads/wires and the larger the mesh widths, the more easily the superheated steam can flow through. The thickness may be up to 15 millimeters, especially 3 to 5 millimeters.

The woven fabrics used according to the invention optionally rest on a continuous wall or a wall provided with through openings, and/or the woven fabrics used according to the invention are designed to be completely or partially self-supporting and/or rest completely or partially on supporting surfaces of the automatic molding machine. The associated walls of the automatic molding machine are preferably made from metal, e.g. aluminum or sintered aluminum, or from ceramics. The walls can also be provided with a porous, gas- and water-permeable coating which is conducive to steam application and steam removal.

The woven fabric used according to the invention is optionally in the form of a panel, flat or shaped. The deformation of the woven fabric plies used according to the invention is also important and applicable to automatic molding machines, irrespective of the number according to the invention of woven fabric plies used.

The deformation of metallic woven fabrics used according to the invention can be achieved by means of a suitable press by pressing and/or deep drawing. The press has a die and a punch which are shaped to match the desired shaped surface.

Deformation can be accomplished cold but is significantly easier if the metallic woven fabrics used according to the invention are heated.

The woven fabric layers are deformed individually or jointly.

In the case of joint deformation, it is advantageous to secure on the foam-side ply a bending aid of approximately the same thickness as the woven fabric used according to the invention, ensuring that the foam-side ply forms approximately the neutral axis in the deformed composite material composed of the woven fabric and the bending aid. In this case, use is made of the knowledge that the neutral axis undergoes the least deformation in the course of bending deformation. Approximately the same thickness includes deviations of plus/minus 50% in the thickness of the bending aid from the thickness of the woven fabric. The auxiliary bending material is preferably a non-foamed film/panel made of PE (polyethylene) and/or PP (polypropylene).

The PE/PP material simultaneously forms a protective film. It is advantageous to arrange protective films on all the outer surfaces of the woven fabric which are subjected to load during deformation.

Using a relatively high tool hardness in the areas of contact with the woven fabric used according to the invention also helps to reduce stress on the outer surfaces of the woven fabric. This prevents the woven fabric used according to the invention from catching in the contact surface of the tool.

Before deforming the woven fabric used according to the invention and/or after connecting the woven fabric plies used according to the invention, heat treatment of the woven fabric plies or of the composite material can reduce stresses in the material and facilitate subsequent deformation.

Experience has shown that the automatic molding machines require cleaning after 500 to 1000 cycles. The feed and discharge lines are then so soiled that cleaning is required. The woven fabric used according to the invention opens up the possibility of extending the running time (operating intervals) until cleaning is next required or significantly increasing the number of cycles. The woven fabrics used according to the invention are favourable for reversing the direction of steam application. Changing the direction of steam application expels the dirt particles which have settled in a woven fabric. Expulsion can take place at the end of the customary running time. However, expulsion can also take place after a short running time and, in an extreme case, after every second cycle. The technique according to the invention for extending the running time of automatic molding machines can advantageously also be applied irrespective of whether the fabric has multiple plies and can also be applied to other automatic molding machines.

Because of the possibility of soiling of the fabric, a woven filter fabric is optionally provided on the inlet side. The dirt particles collect in the filter fabric.

Another advantage of the woven fabrics used according to the invention comes into play when cross-flow steam application is employed. According to the invention, a molding charge is steam-treated from several directions. This can take place simultaneously or at alternate intervals. Cross-flow steam application makes the quality of welding of the beads more uniform. When applying steam in just one direction, the temperature of the steam falls during passage through the material owing to heat transfer. Consequently, there is also a gradient as regards the surface temperature of the beads. Cross-flow steam application ensures that those areas which were previously at the end of the steam path are reached by fresh steam. Cross-flow steam application is achieved by providing additional walls of the automatic molding machine with steam application openings and, if appropriate, exhaust-steam openings with corresponding inlet and outflow lines. To control the individual lines appropriate slide valves are provided in the inlet lines and/or outlet lines.

Cross-flow steam application is also advantageous if uniform steam distribution has not taken place in the mold cavity. Those areas which have been inadequately penetrated by steam are then reached by the steam through cross-flow steam application.

Cross-flow steam application is also important for automatic molding machines independently of the woven fabric according to the invention.

The above-discussed embodiments of the present invention will be described further herein below. When the word "invention" is used in this specification, the word "invention" includes "inventions", that is the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying drawings.

FIG. 1 shows schematically an automatic molding machine;

FIG. 2 shows the bead-side woven fabric layer in an enlarged view;

FIG. 3 shows a cross-section through the bead-side woven wire fabric;

FIG. 4 shows the multi-ply nature of a woven fabric;

DESCRIPTION OF THE PREFERRED EMBODIMENT

Figure 5:
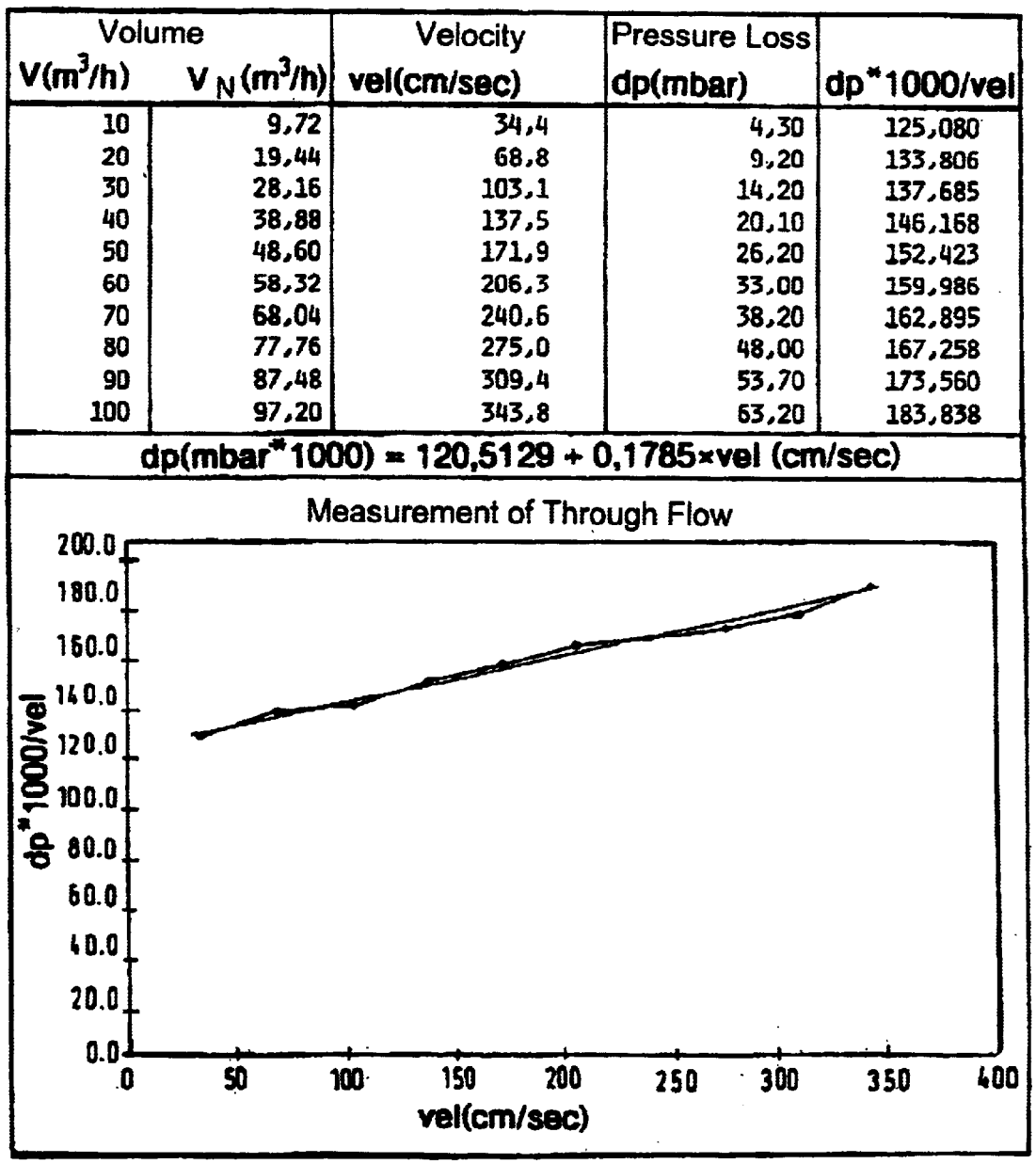
FIG. 5 shows a table and graph of flow characteristics.
Figure 6:
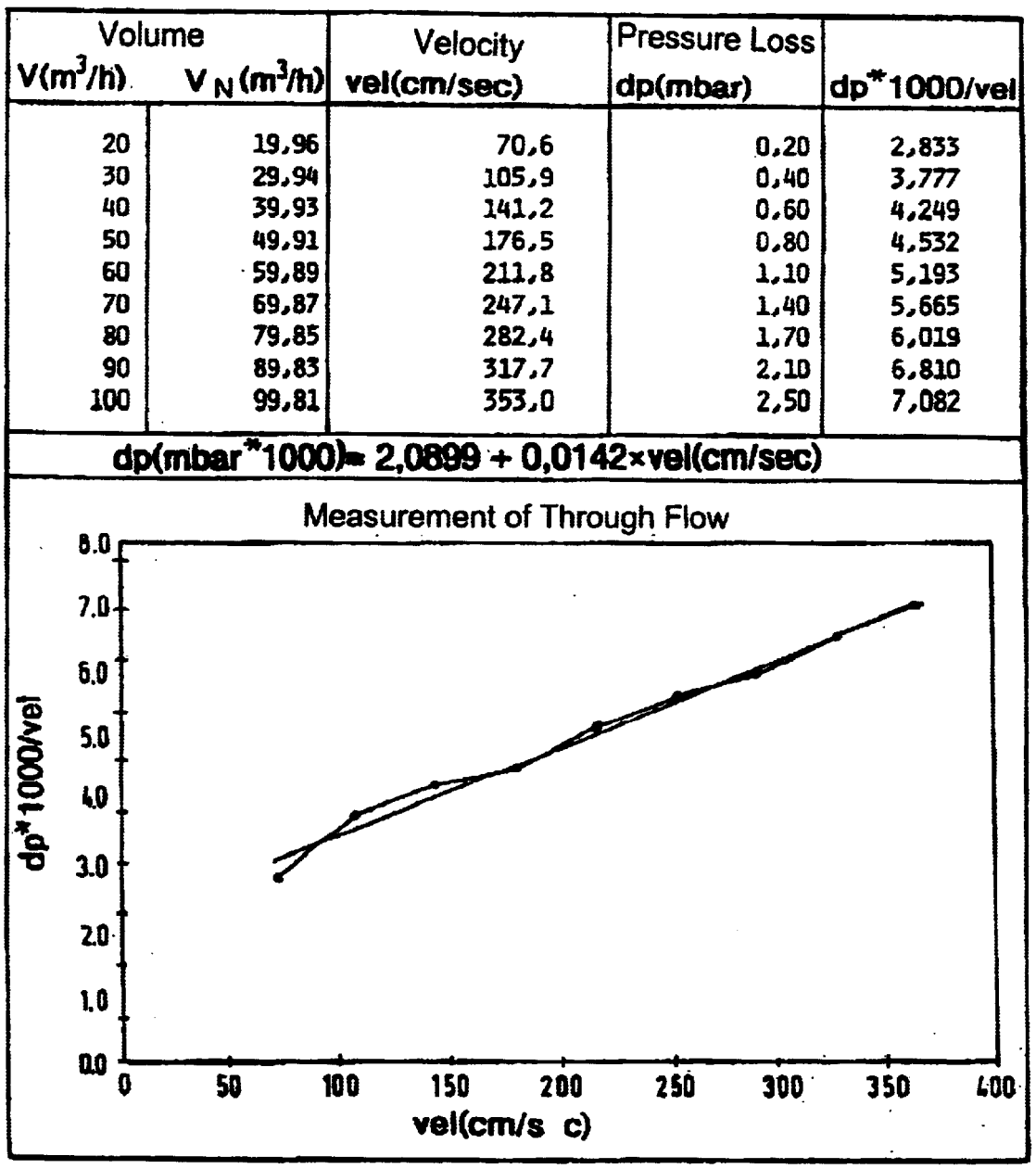
FIG. 6 shows a further table and further graph of flow characteristics.

FIG. 1 shows the shape of an automatic molding machine comprising a bottom part 1 and a top part 7 with a seal 10 in between at the edge. The bottom part 1 is provided with a woven wire fabric layer 5.

After the mold has been closed, the mold cavity is evacuated via a line 2 by opening a valve 3. The vacuum is generated by pumping out the air. Its place is taken by compressed air flowing in simultaneously via a line 8 owing to the opening of a valve 9. Beads 6 are fed in with the air. The beads have a diameter of 3 millimeters and are composed of PP. The air pressure is 6 bar.

The compressed air flows through the woven fabric layer 5. The woven fabric layer 5 takes up the compressed air in an optimum manner and guides it to openings 4 in the bottom part 1. The woven fabric layer 5 is a two-ply structure and is made of woven wire fabric. Each layer has a different mesh width. The woven fabric layer on the bead side has a significantly smaller mesh width than the woven fabric layer on the same side as the bottom part. In the exemplary embodiment this is 100 mesh (0.14 millimeters). With a conventional relationship between wire diameter and mesh width, this gives a wire diameter of 0.112 millimeters. In exceptional cases, a free choice of wire diameter is made.

FIG. 2 shows the bead-side woven fabric layer in an enlarged plan view. The steel wires rest one on top of the other. FIG. 3 shows a cross section through the bead-side woven wire fabric. In the bottom ply, the wires 11 and 12 form arcs 13, giving a flat surface on the bead side (apart from the contour, shown in FIG. 1, of the woven fabric layer). The multi-ply nature of the woven fabric is illustrated in FIG. 4. Ply 20 comprises the wires 11 and 12 illustrated in FIGS. 2 and 3. Ply 22 is identical with ply 20. In the exemplary embodiment, there is between them a filter ply 21 composed of non-woven wires lying adjacent to one another.

Ply 23 shows the clear features of a woven supporting fabric. The wire diameter is a multiple of the wire diameter of plies 20 to 22, as is the mesh width resulting from the spacing of the wires. Ply 24 comprises an even coarser woven supporting fabric. All the plies of woven fabric are sintered together.

The contour shown in FIG. 1 results from deformation in a suitable press. The bottom die belonging to the press has the contour of the molding cavity of the bottom part 1. The woven fabric illustrated in FIG. 4 rests on the bottom die. A layer of non-foamed PE films, the thickness of which corresponds to the thickness of the woven fabric, is placed on top. The woven fabric and the film layer resting on it are then pushed into the bottom die. The associated top die has the approximate shape of the molding or mold cavity illustrated in FIG. 1. This means that the superimposed film layer must be taken into account, to some degree, in forming the contour of the top die.

After complete filling of the mold cavity, superheated steam is forced through the line 8 into the mold cavity instead of air. The superheated steam must flow through the beads. During this process, the air is displaced between the beads. The steam heats up the beads and their surface softens.

The increase in temperature causes the beads to expand. Owing to the softened outer surface of the beads and the pressure, welding takes place at all the points of contact between the beads. The gaps between the beads are closed at the same time.

After adequate cooling following opening of the mold, the finished product 6 is removed from the mold cavity.

Figure 7:
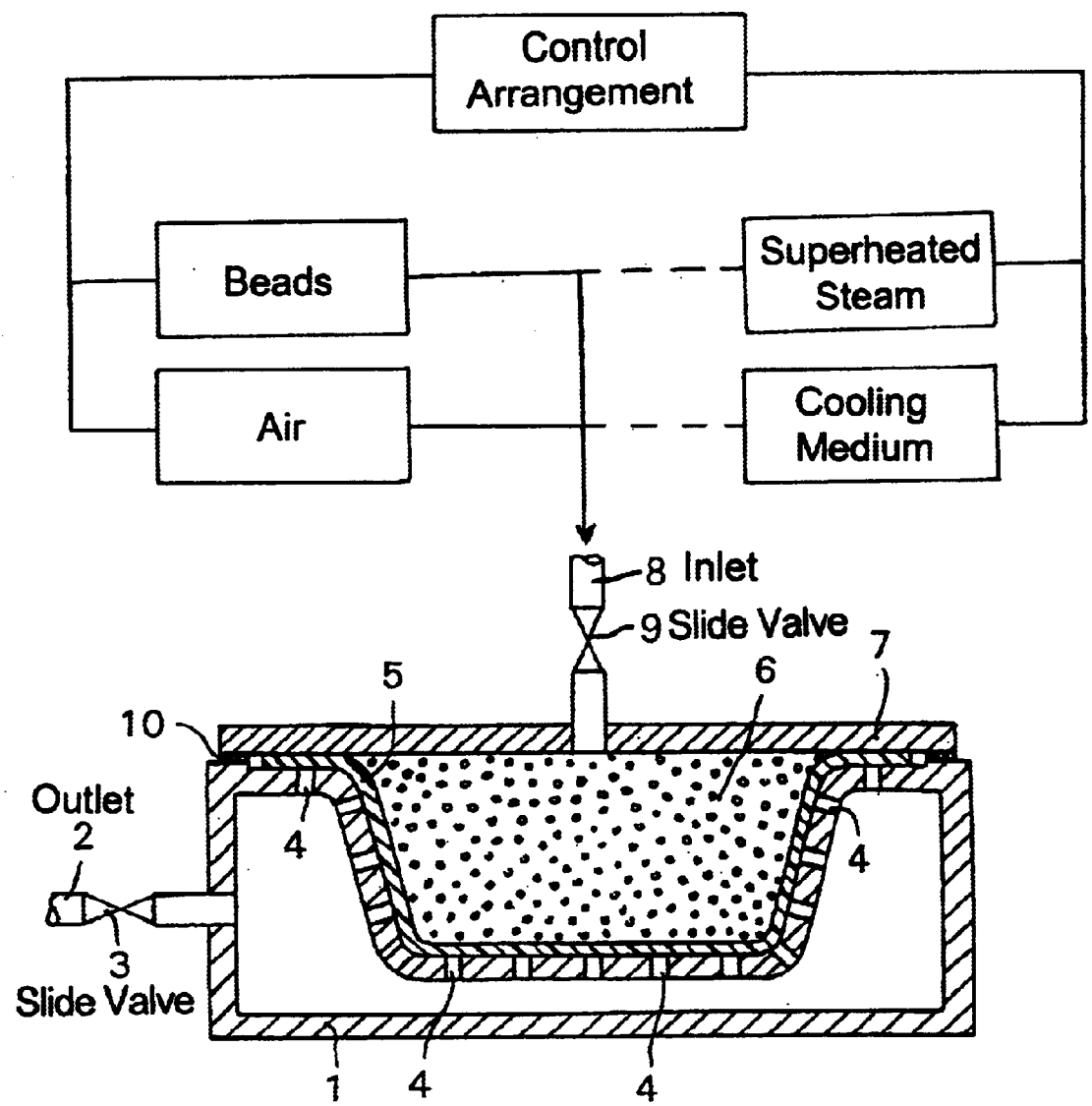
FIG. 7 is a diagrammatic illustration of a molding system in accordance with the present invention.

FIG. 7 schematically shows the introduction of air and beads and the introduction of superheated steam, which can be followed by cooling of the mold.

Figure 8:
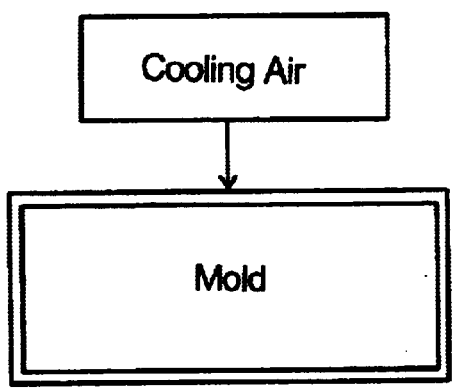
FIGS. 8 and 9 illustrate cooling of the mold with cooling media.
Figure 9:
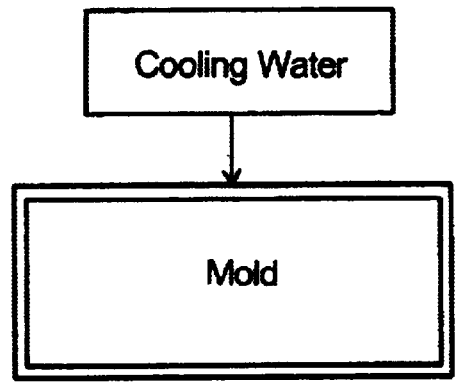

FIGS. 8 and 9 illustrate the cooling of the mold, respectively with cooling air or cooling water.

Figure 10:
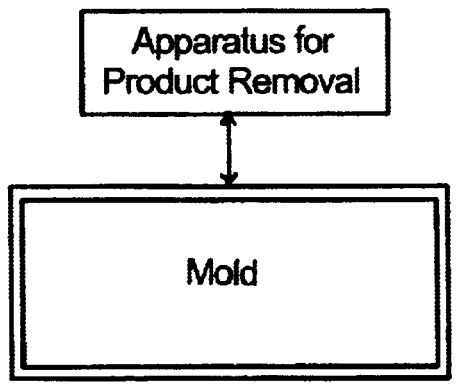
FIGS. 10 and 11 illustrate apparatus for removing the molded item.
Figure 11:
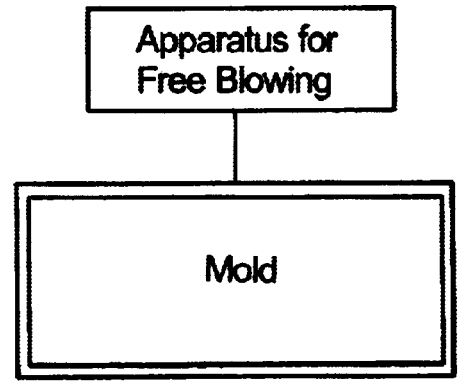

FIGS. 10 and 11 illustrate the removal of the molded product.

Figure 12:
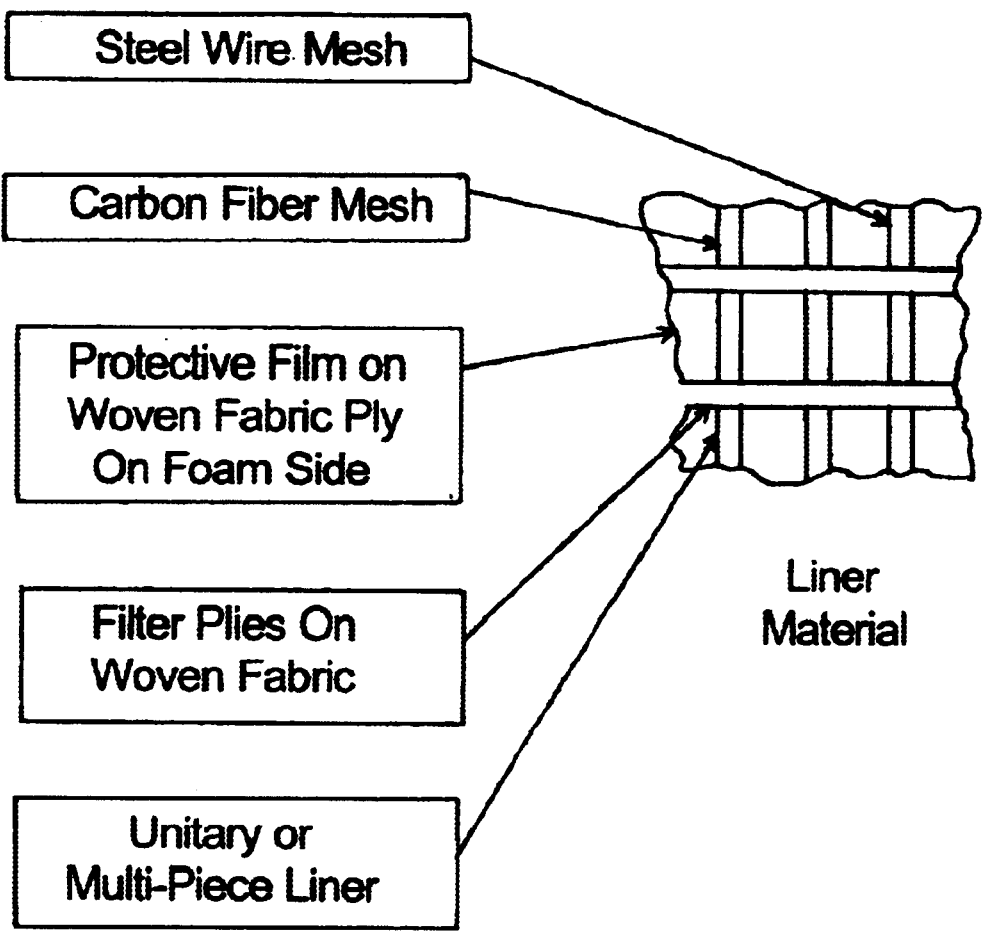
FIG. 12 illustrates features of the liner material.
Figure 13:
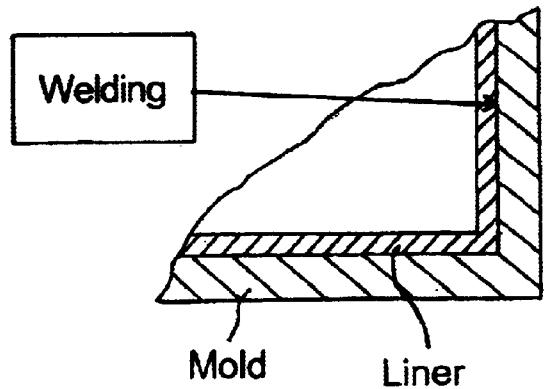
FIGS. 13–20 illustrate fastening of the liner to the mold.
Figure 14:
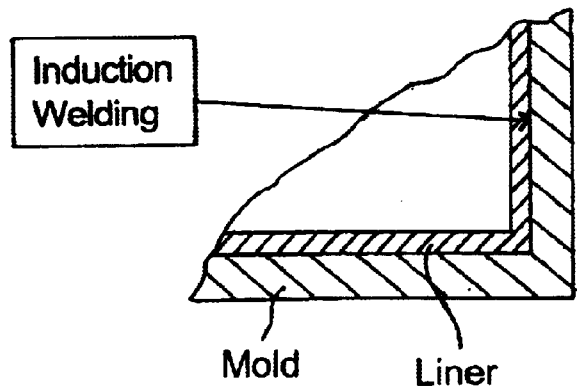
Figure 15:
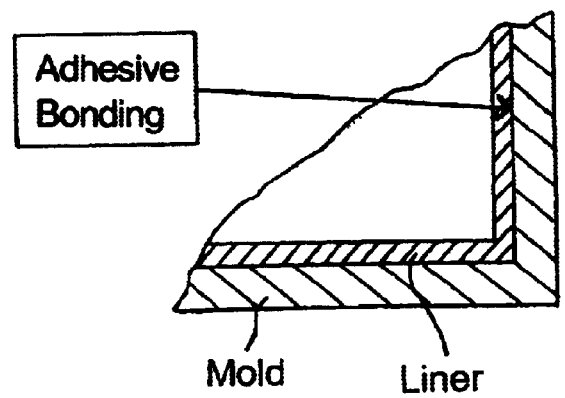
Figure 16:
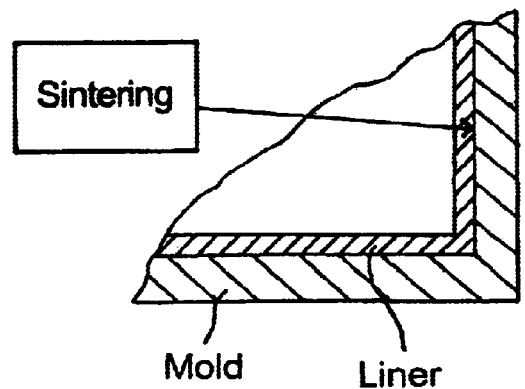
Figure 17:
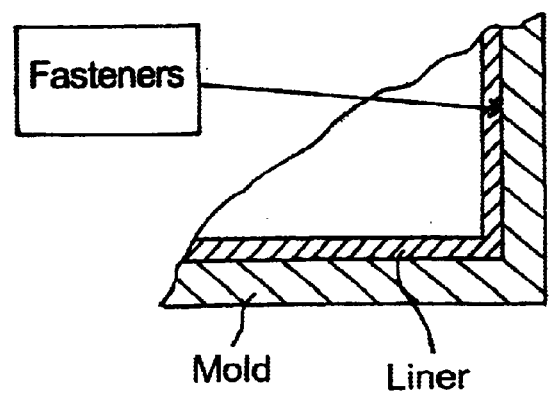
Figure 18:
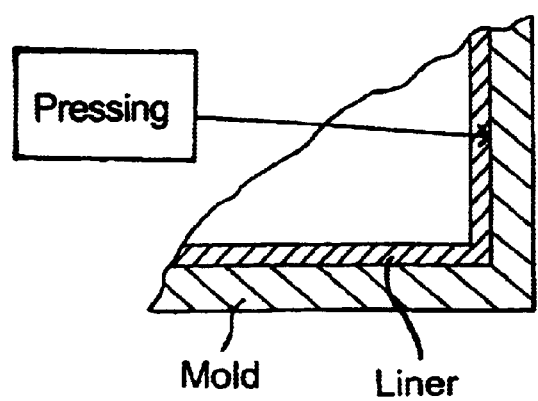
Figure 19:
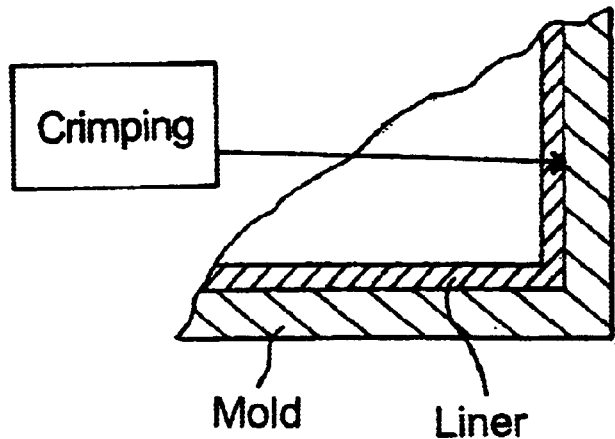
Figure 20:
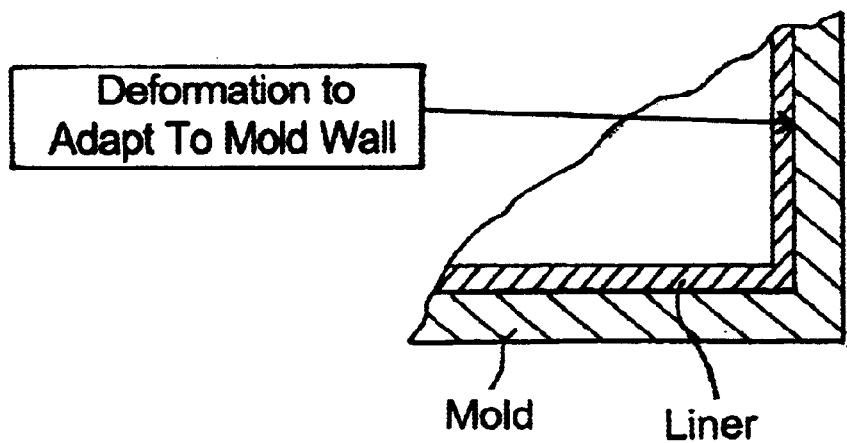
Figure 21:
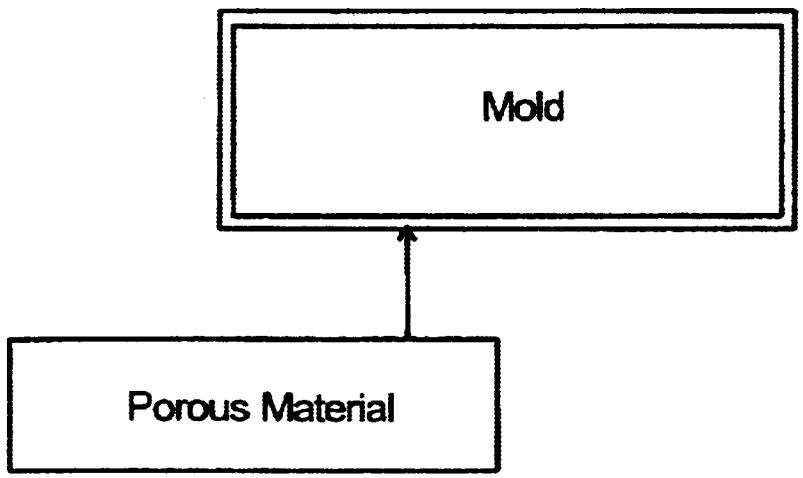
FIGS. 21–25 illustrate materials of construction of the mold.
Figure 22:
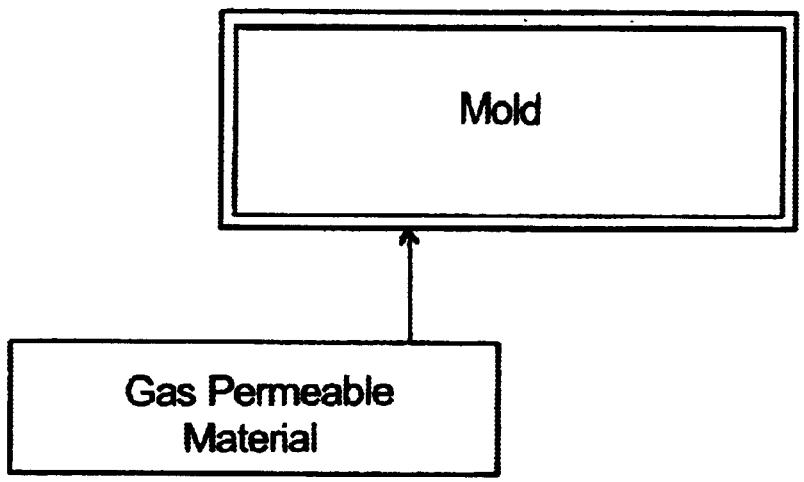
Figure 23:
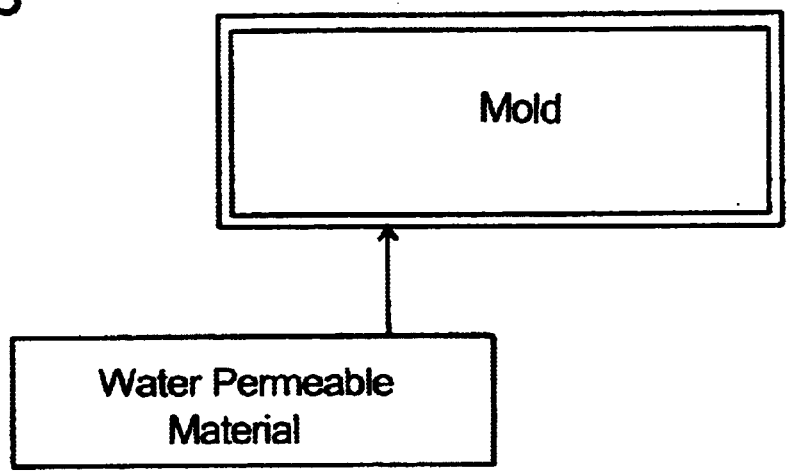
Figure 24:
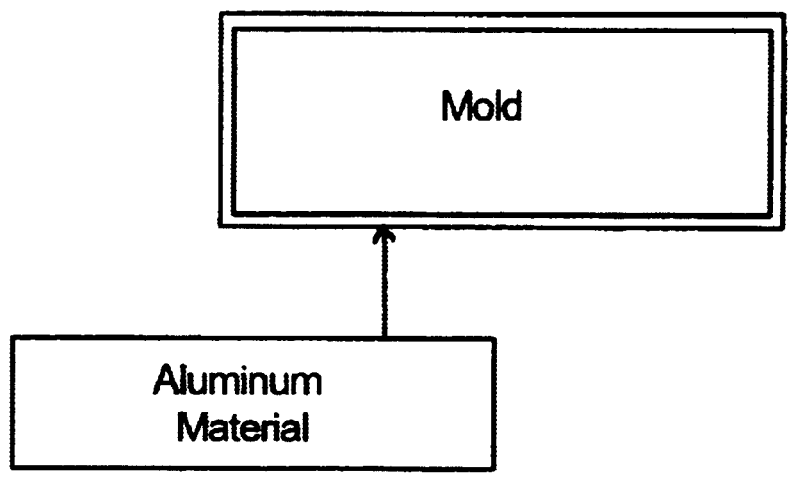
Figure 25:
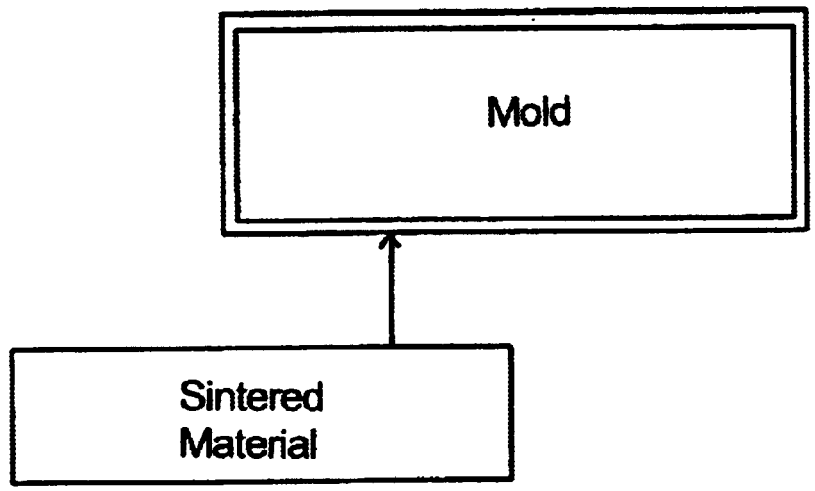
Figure 26:
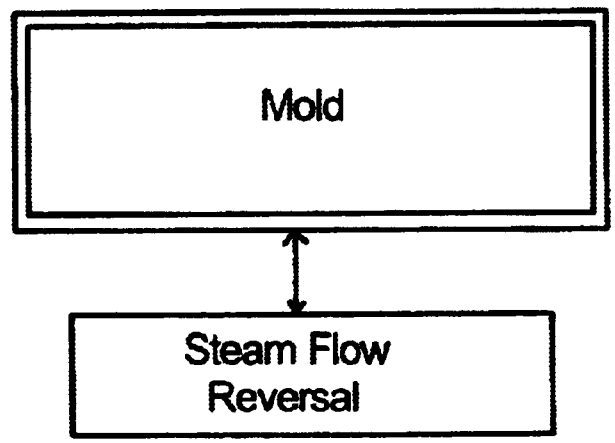
FIGS. 26–30 illustrate steam handling and associated operations.
Figure 27:
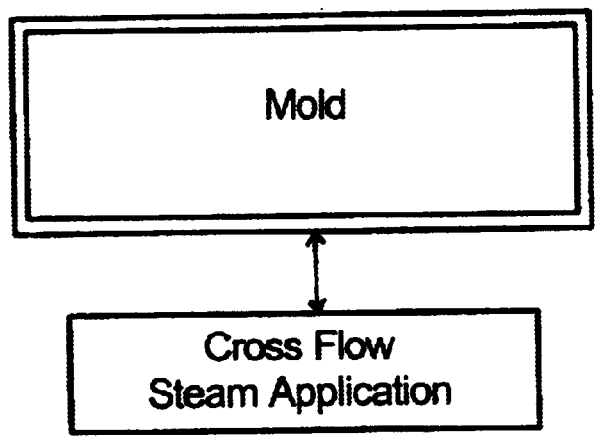
Figure 28:
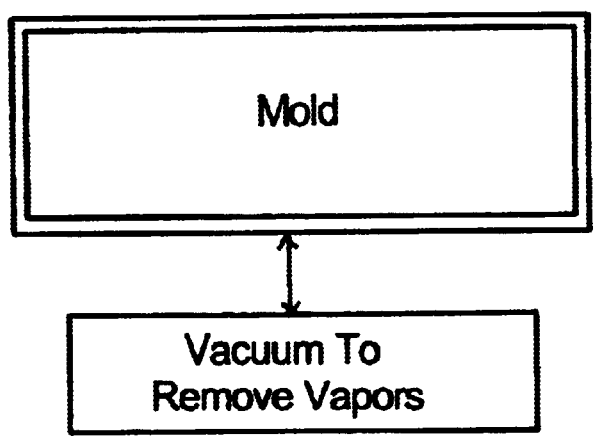
Figure 29:
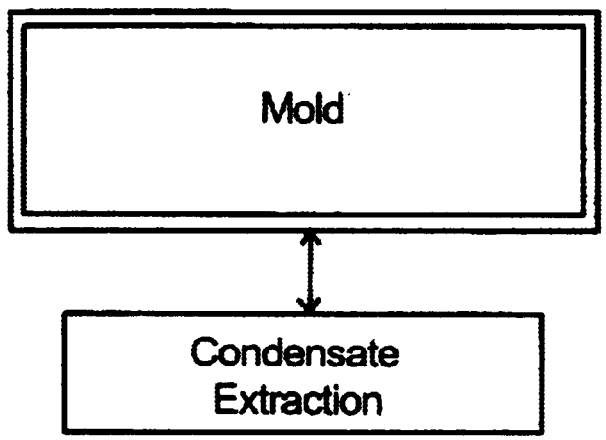
Figure 30:
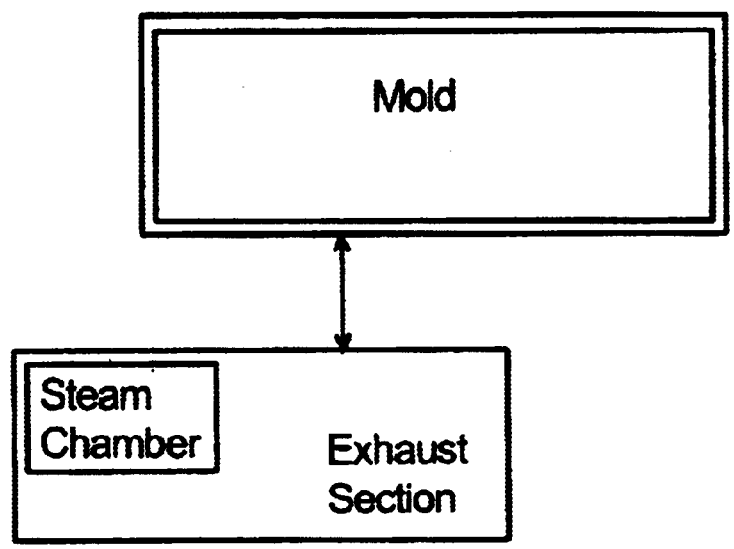

FIG. 12 illustrates details of the liner such as a steel wire mesh, a carbon fiber mesh, a protective film on the woven fabric ply on the foam side, filter plies on the woven fabric, and a unitary or multi-piece liner structure.

FIGS. 13 to 20 illustrate fastening of the liner to the mold, by means of operations such as welding, induction welding, adhesive bonding, sintering, fasteners, pressing, crimping, and deformation of the liner to be adapted to the wall of the mold.

FIGS. 21 to 25 illustrate materials of construction of the mold, for example, a porous material, a gas permeable material, a water permeable material, an aluminum material, or a sintered material.

FIGS. 26 to 30 illustrate unit operations and equipment for handling steam, such as, steam flow reversal, cross flow steam application, vacuum extraction to remove gases or vapors, condensate extraction, and an exhaust section with steam chamber.

Figure 31:
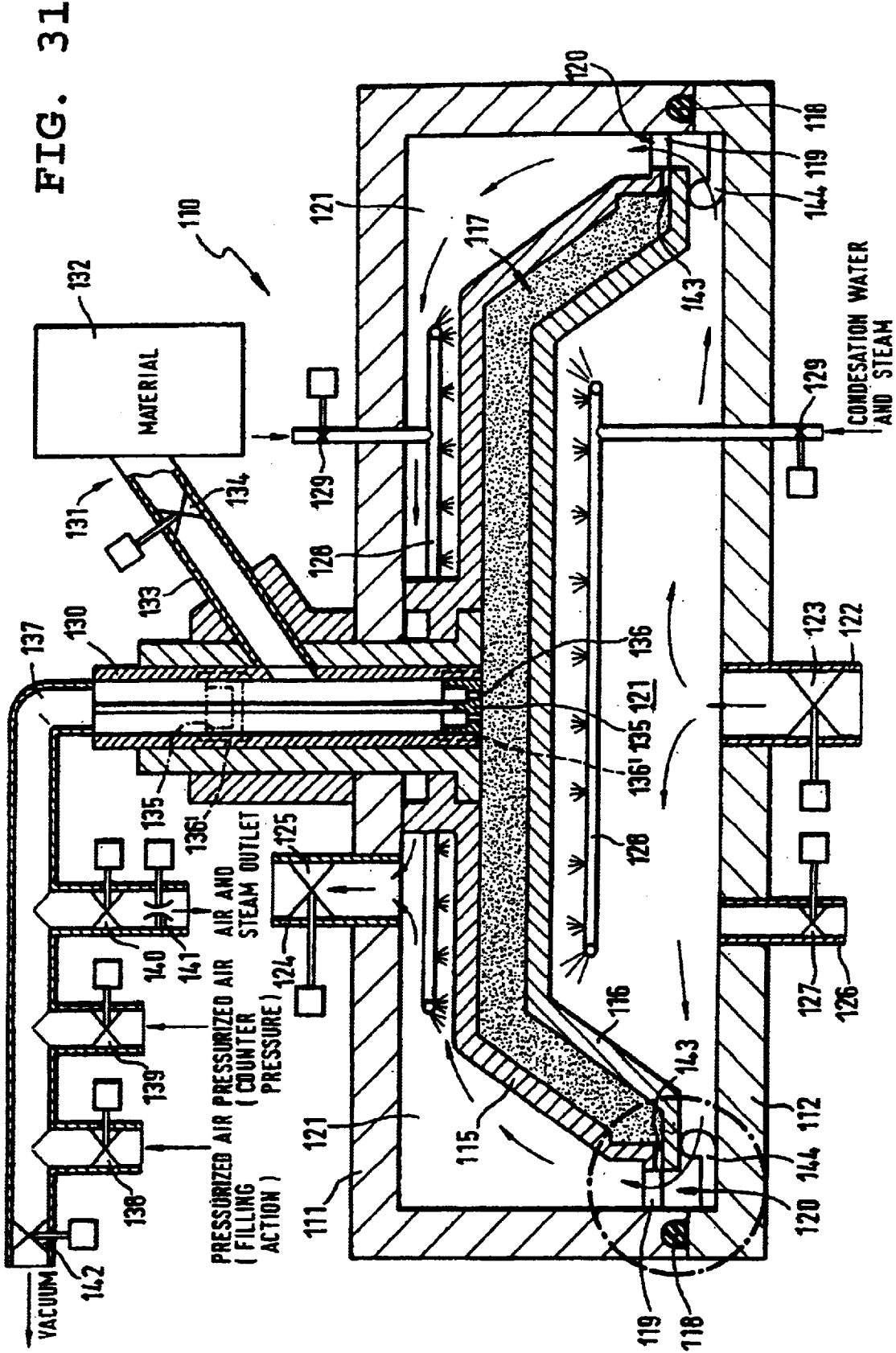
FIG. 31 is a schematic illustration of a molding system.

The example of FIG. 31 involves an apparatus for the manufacture of molded objects or parts of foamed synthetic, e.g., foamed beads. The foaming apparatus 110 shown in FIG. 31 has two steam chamber halves, namely, a top part 111 and a core part 112. Inserted in each of these steam chamber halves are one or several conforming mold wall parts 115 and 116, respectively. Between the two mold wall parts 115 (top) and 116 (core) a mold cavity 117 is formed. The top part 111 and the core part 112 can be separated from each other and are moved towards each other to close the mold and sealed against each other by means of a seal 118 to form a closed interior in which the mold wall parts 115 and 116 are mounted. The mold wall parts 115 and 116 are fastened to the outside wall parts of the steam chamber halves 111 and 112 by means of fastening devices 119 which form passages 120 so that, when the mold is closed, the interior enclosed by the two steam chamber halves 111 and 112 forms one common steam chamber 121, the peripheral rims of the mold wall parts 115 and 116 sitting on top of each other inside the steam chamber 121. In the example of FIG. 31, passages 143 in the form of slots extending in circumferential direction of the mold-cavity 117 and about 0.2 millimeters wide and up to several centimeters long are formed in peripheral rims between the mold cavity 117 and the steam chamber 121 through which air and steam can flow. To make sure of a tight fit between the peripheral rims of the mold wall parts 115, 116 when the sealing element 118 is sealingly compressed, the mold wall part 116 can be mounted in the steam chamber part 112 by means of elastically buffering fastening elements 144. Connected to the steam chamber 121 are at least one steam inlet 122 with a steam inlet valve 123 centrally controlled on the machine and at least one steam outlet 124, again with a centrally controlled steam outlet valve 125. Also attached to the steam chamber 121 is a vacuum connection 126 with a centrally controlled suction valve 127. Furthermore, spraying devices 128 for the application of a coolant can be inserted in the steam chamber 121. These spraying devices 128 are likewise equipped with centrally controlled valves 129. They serve the wetting of the surfaces of the mold wall parts 115 and 116 facing the steam chamber 121 in order to cool them. Connected to the mold cavity 117 is at least one connecting line 130 conducted through the mold wall part 115 and through the steam chamber top 111 in the example shown. The filling device 131 for prefoamed synthetic particles to be processed is attached to this connecting line 130. This filling device has a closed raw material container 132 and is known per se. At least one centrally controlled raw material valve 134 is inserted in the connecting line 133 from the raw material container 132 to the connecting line 130. Furthermore, as another component of the filling device 131, there is mounted, so as to be axially movable between the closed position shown in full lines in FIG. 31 and the open position shown in broken lines, a quill valve 135. In the embodiment shown, this quill valve 135 has, in its quill plate, through holes 136 which, however, do not permit the passage of pre-foamed synthetic particles. Instead of the holes 136 in the quill plate 135 there could also be provided, in the wall of the connecting line 130, channels 136' bridging the quill plate in closed position, such as axial slits or holes as indicated in dashed lines in FIG. 31.

Attached to the connecting line 130 and the operating line 137 containing the valves required for operation of the mold, are the following:

A centrally controlled filling air valve 138 to which the air needed to operate the filling device 131 in the manner of an injector and to distribute the synthetic particles in the mold cavity 117 is fed; a centrally controlled counterpressure valve 139 to which compressed air is fed under a pressure equal to or slightly higher than the pressure of the steam introduced into the steam chamber 121; a steam venting valve 140 with an adjustable flow control 141 downstream to let off air contained in the mold cavity and let off steam flushing through the mold cavity; and a suction valve 142 connected to an evacuator.

At the start of the work cycle the mold is closed first so that a closed, single-unit steam chamber 121 is formed at the sealing device 118 by the two steam chamber parts 111 and 112, except for the valve-controlling connections. After the mold is closed, the filling device 131 is put into motion. To do this, the quill plate 135 is moved into the open position shown in dashed lines. The raw material valve 134 and the filling air valve 138 are opened. The counterpressure valve 139 and the steam venting valve 140 are closed whereas the steam outlet valve 125 on the steam chamber 121 is open. Given these valve positions, raw material is sucked or pushed through the raw material valve 134 into the connecting line 130 where it is gripped by the filling air that is coming from valve 138 and is flowing through the holes 136 in the quill plate 135, and such raw material then distributed in the mold cavity 117. The air flow penetrates the passages 143 leading from the mold cavity 117 into the steam chamber, said passages 143 being distributed in the example of FIG. 31 over the peripheral rim of the mold part 115 as constantly open through slots of e.g. 0.2 millimeters width. The air flowing through the passages 143 flows through the steam chamber 121 and through the opened steam venting valve 125 to the outside.

To terminate the filling operation, the quill plate 135 is moved into its lower end position while the filling air valve 138 and the raw material valve 134 remain open for a time of, e.g., 0.1 to 1 second in order to return all synthetic particles still in the connecting line 133 into the raw material container 132. As the valves 134 and 138 are closed, the counterpressure valve 139 and the steam inlet valve 123 are opened. This causes the steam chamber 121 to be flushed with steam, whereby the air in the steam chamber is flushed out until, after a flushing time span since the steam inlet valve 123 was opened has elapsed, the steam outlet valve 125 on the steam chamber 121 is closed. The steam chamber 121 is now filled with saturated steam until a pressure desired to heat the mold wall parts 115 and 116 has built up. At the same time, compressed air is introduced into the mold cavity 117 from the counterpressure valve 139 until a counterpressure has built up there which is just as high as or even a little higher than the steam pressure in the steam chamber 121.

The counterpressure buildup in the mold cavity 117 in comparison with the saturated steam pressure built up in the steam chamber 121 can be controlled by manual adjustment or by the use of a differential pressure valve. The counterpressure buildup in the mold cavity 117 prevents steam from getting from the steam chamber 121 through the passages 143 into the mold cavity 117. It is easier for some compressed air to flow from the mold cavity 117 through the passages 143 into the steam chamber 121.

After the desired heating time for the mold wall parts 115 and 116 has elapsed, the foamed synthetic particles are fused by means of steam. Towards this end, the counterpressure valve 139 is closed and the steam venting valve 140 opened after the flow control 141 was set to a desired flow rate. This causes the pressure of the air present between the synthetic particles to drop. This, in turn, causes steam from the steam chamber 121 and with constant resupply through the open steam inlet valve 123 to be pushed through the passages 143 into the mold cavity 117 and through the porous plastic filling in the mold cavity 117. This steam, flowing through the filling of the mold cavity 117 in the manner of a steam shock, then reaches the outside by penetrating the holes 136 in the quill plate 135, the connecting line 130, the operating line 137, the steam venting valve 140 and the flow control 141. This steam conduction achieves a pressure difference only as small as needed for the desired flow behavior to be built up between the mold cavity 117 and the steam chamber 121. This fusing of the synthetic particles by flushing them with steam may cover a time span of e.g. 1 second. The saturated steam used for fusing may be of a temperature between 110 degrees Celsius and 160 degrees Celsius, depending on the material. After completion of the fusing phase, the steam venting valve 140 and the steam inlet valve 123 are closed. The valves 129 for coolant feeding are opened if required. The suction valves 127 and 142 are also opened. In this manner, the steam is sucked out of the connecting line 130, the operating line 137 and the steam chamber 121 simultaneously. Condensate caught or coolant sprayed on the surface of the mold wall parts 115 and 116 facing the steam chamber 121 are also evaporated so that the mold wall parts 115 and 116 are cooled due to the suction action.

To provide the heat for the molding operation, the mold wall parts are heated to 110 degrees Celsius to 160 degrees Celsius by the saturated steam supplied to the steam chamber 121, whereas the temperature at the mold wall parts 115 and 116 is reduced for the cooling operation to about 60 degrees Celsius to 100 degrees Celsius, depending on the material. To open the mold, the suction valve 127 must be closed and the steam chamber vented, whereas the suction valve 142 may still remain open in order to retain the molding on the mold wall part 115. After the mold is opened, the suction valve 142 must then be closed and possibly one of the compressed air valves 138 or 139 opened briefly if it is desired to eject the molding from the mold wall part 115 by compressed air. This concludes the work cycle, which is then repeated in the manner described.

Figure 32:
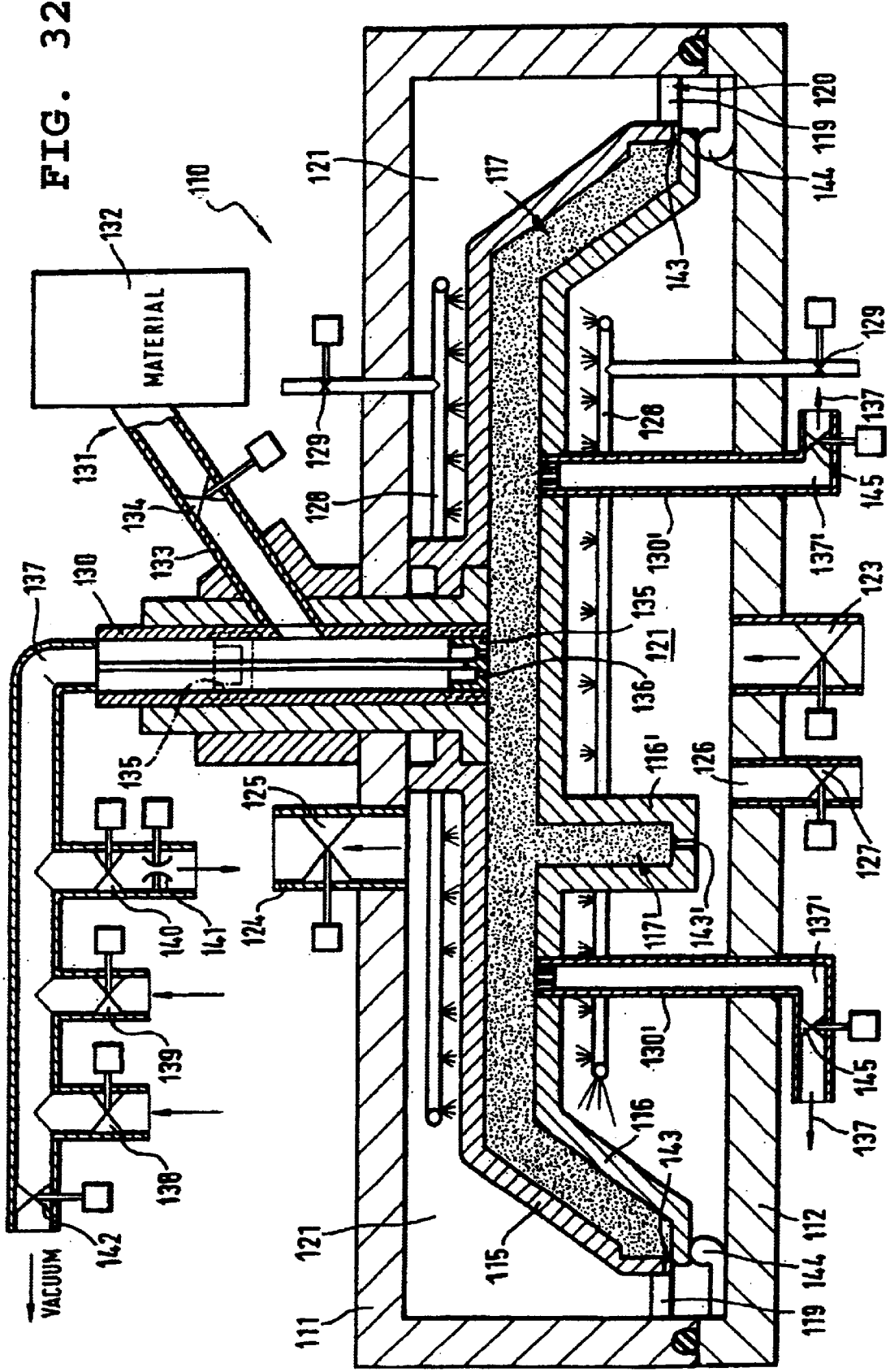
FIG. 32 is a view similar to FIG. 31 showing a variant of a molding system.

The embodiment of the foam molding machine shown in FIG. 32 is basically of the same design as that of the machine according to FIG. 31. FIG. 32 shows additionally a mold cavity 117' designed to mold a molding with parting wall. In that case, in order to let the filling air out of and fusing steam into the mold cavity 117', an additional and necessary spot suited for the function is provided at the depression in the mold cavity 117' forming the parting wall of the molding. Therefore, additional through holes 143' are provided there in the molding wall 116'.

FIGS. 31 and 32, respectively, are copies of the FIGS. 1 and 5 from U.S. Pat. No. 5,100,597 issued to Erlenbach on Mar. 31, 1992, from which figure copies all of the reference numerals present in the original figures, as they appear in U.S. Pat. No. 5,100,597 have been removed. U.S. Pat. No. 5,100,597 is hereby incorporated by reference as if set forth in its entirety herein. The reference numerals that have been removed from these figures of this U.S. Pat. No. 5,100,597, essentially reproduced herein as FIGS. 31 and 32, indicate arrangements that are well known in the prior art.

One feature of the invention resides broadly in a method for operating an automatic molding machine for producing plastic foam products from beads, with a mold cavity into which the beads are fed and subjected to a gaseous heat transfer medium, in particular superheated steam, the gaseous heat transfer medium entering the mold cavity from a surface of the automatic molding machine and leaving it again through another surface of the automatic molding machine, and a woven fabric being provided on at least one surface of the automatic molding machine, characterized by the use of a multi-ply woven fabric (5) with a fine-mesh woven fabric ply (11, 12, 20, 21, 22) on the foam side and a coarse-mesh woven fabric ply (23, 24) arranged under the latter as a supporting structure.

Another feature of the invention resides broadly in a method characterized by the production of smooth surfaces on the molding.

Yet another feature of the invention resides broadly in a method characterized by the use of a woven fabric ply (11, 12, 20, 21, 22) on the foam side with a mesh width which is less than half the diameter of the beads and/or by the use of a woven fabric structure with at least one low-mass woven fabric ply on the foam side and/or a condensate discharge.

Still another feature of the invention resides broadly in a method characterized by condensate extraction.

A further another feature of the invention resides broadly in a method characterized by the use of a steam chamber in the exhaust-steam section and the application of a vacuum to the steam chamber.

Another feature of the invention resides broadly in a method characterized by the use of a woven fabric ply (11, 12, 20, 21, 22) with a mesh width of 0.001 to 0.5 millimeters, preferably 0.005 to 0.2 millimeters, in the case of beads with a diameter of 3 to 5 millimeters.

Yet another feature of the invention resides broadly in a method characterized by the production of easy-clean surfaces for the transportation and/or storage of foodstuffs and/or for the processing of moldings by laminating of thin films.

Still another feature of the invention resides broadly in a method characterized by the use of woven fabrics (11, 12, 20, 21, 22, 23, 24) with a customary thread or wire thickness derived from the mesh width or a thickness which is equal to or less than ten times, preferably equal to or less than five times, the mesh width or even equal to or less -than the mesh width.

A further feature of the invention resides broadly in a method characterized by the molding being acted upon with a coolant through the woven fabric after the application of steam has ended.

Another feature of the invention resides broadly in a method characterized by the use of cooling air and/or cooling water as the coolant.

Yet another feature of the invention resides broadly in a method characterized by cross-flow steam application.

Still another feature of the invention resides broadly in a method characterized by steam feed openings and/or exhaust steam openings in the various walls of the automatic molding machine and inlet and outlet lines with slide valves.

A further feature of the invention resides broadly in a method characterized by flow reversal when blowing free the woven fabric ply.

Another feature of the invention resides broadly in a method characterized by blowing free after one or more cycles irrespective of the soiling or blowing free after soiling.

Yet another feature of the invention resides broadly in a method characterized by reversal of the flow of steam with and/or without the automatic molding machine being filled.

Still another feature of the invention resides broadly in a method characterized by the use of a woven supporting structure (23, 24) with a mesh width which is 1.5 to 20 times that of the woven fabric structure on the foam side, and with a thread or wire thickness which is 1.5 to 20 times that of the woven fabric structure (11, 12, 20, 21, 22) on the foam side.

A further feature of the invention resides broadly in a method characterized by the use of a woven supporting structure (23, 24), the mesh width of which is at least equal to the mesh width of the woven fabric structure (11, 12, 20, 21, 22) on the foam side plus 2.5 times the thread or wire thickness of the woven fabric structure (11, 12, 20, 21, 22) on the foam side.

Another feature of the invention resides broadly in a method characterized by the use of a woven fabric structure (20, 21, 22, 23, 24) with an offset ply (21) between the woven fabric plies.

Yet another feature of the invention resides broadly in a method according to one of claims 1 to 19, characterized by the use of woven fabric structures (5), the plies (11, 12, 20, 21, 22, 23, 24) of which are completely or partially connected to one another and/or to the associated wall of the automatic molding machine by
a) welding and/or
b) adhesive bonding and/or
c) sintering and/or
d) fastening element and/or
e) pressing and/or crimping Still another feature of the invention resides broadly in a method characterized by induction welding.

A further feature of the invention resides broadly in a method characterized by wires made of steel and/or threads made of carbon fibers.

Another feature of the invention resides broadly in a method characterized by the use of woven fabric structures (5) with a thickness of up to 15 millimeters.

Yet another feature of the invention resides broadly in a method characterized by the use of a woven fabric structure (5) with a thickness of 3 to 5 millimeters.

Still another feature of the invention resides broadly in a method characterized by individual or group or joint deformation of all woven fabric plies (11, 12, 20, 21, 22, 23, 24) to adapt them to the walls of the automatic molding machine.

A further feature of the invention resides broadly in a method characterized by the pressing of the woven fabric plies (11, 12, 21, 22, 23, 24).

Another feature of the invention resides broadly in a method characterized by the use of a protective film and/or protective panel between the woven fabric ply (11, 12, 21, 22, 23, 24) and the pressing tool and/or the use of at least surface-hardened pressing tools.

Yet another feature of the invention resides broadly in a method characterized by the use of a protective film on the woven fabric ply (11, 12, 20, 21, 22) on the foam side with a thickness approximately the same as that of the remainder of the material to be deformed.

Still another feature of the invention resides broadly in a method characterized by the use of protective films and/or panels made of PE and/or PP.

A further feature of the invention resides broadly in a method characterized by heat treatment of metallic woven fabric plies before deformation and/or after connection of the woven fabric plies.

Another feature of the invention resides broadly in a method characterized by the use of one or more filter plies (22) on the woven fabric and/or the use of woven fabrics with one or more included filter plies (22).

Yet another feature of the invention resides broadly in a method characterized by the use of one-piece or multi-piece linings of mold cavities and/or completely or partially self-supporting linings.

Still another feature of the invention resides broadly in a method characterized by the use of porous, gas- and/or water-permeable walls for the automatic molding machine.

A further feature of the invention resides broadly in a method characterized by the use of molding walls made of aluminum and/or sintered material.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

With respect to ranges mentioned, Applicants contemplate that every increment between the endpoints of ranges disclosed herein, for example, mesh width, thickness, temperature, pressure and time is encompassed herein as if it were specifically stated.

For example, with respect to a mesh width range of about 0.001 to about 0.5 millimeters, this is to be understood to include, within the range of millimeters, steps of millimeters of at least 0.001, or more or less, such that any one thousandths of a millimeter may be a limit of a diminished range of millimeters, that if the range encompasses about one thousandths of a millimeter increments thereby specifically including about 0.002 millimeters, 0.003 millimeters and so forth.

For example, with respect to a temperature range of about 80 degrees Celsius to 120 degrees Celsius, this is to be understood to include, within the range of degrees Celsius, the steps of degrees Celsius of at least one degree Celsius, or more or less, such that any one degree Celsius may be a limit of a diminished range of millimeters, that if the range encompasses about one degree Celsius increments thereby specifically including about 81 degrees Celsius, 82 degrees Celsius, and so forth.

For example, with respect to a pressure range of about 1.2 bar to about 6 bar, this is to be understood to include, within the range of bars, steps of bars of at least 0.1 bar, or more or less, such that any one tenths of a bar may be a limit of a diminished range of bars, that if the range encompasses about one tenths of a bar increments thereby specifically including about 1.3 bar, 1.4 bar, 1.5 bar and so forth.

For example, with respect to time of about 2 minutes to about 5 minutes, this is to be understood to include, within the range of minutes, steps of minutes of at least 1 second, or more or less, such that any one second may be a limit of a diminished range of minutes/seconds, that if the range encompasses about one second increments thereby specifically including about 2 minutes and one second, 2 minutes and two seconds, two minutes and three seconds, and so forth.

The following patents, patent applications, or patent publications, which were cited in the PCT Search Report dated Jun. 13, 2000, and/or cited elsewhere are hereby incorporated by reference as if set forth in their entirety herein: as follows: U.S. Pat. No. 4,264,544 issued to Wilhein on April, 1981; WO 95 08433 (MANKIEWICZ GEBR & CO; PHOENIX AG); and French Patent No. 2,772,300 of Jun. 18, 1999.

German Patent Publication DOS 44 01 579 A1 published on Jul. 27, 1995 and its corresponding European equivalent, EP 0664 313, mentioned above, and other equivalents, are hereby incorporated by reference as if set forth in their entirety herein.

German Patent Publication No. 44 33 579 A1 published on Mar. 30, 1995 and its corresponding PCT application PCT/DE94/01096, mentioned above, are hereby incorporated by reference as if set forth in their entirety herein.

The corresponding foreign and international patent publication applications, namely, Federal Republic of Germany Application No. 199 07 279.5, filed on Feb. 21, 1999, having inventors Jürgen BRUNING and Eberhard LANG, and DE-OS 199 07 279.5, having inventors Jürgen BRUNING and Eberhard LANG, and DE-PS 199 07 279.5, having inventors Jürgen BRUNING and Eberhard LANG, and International Application No. PCT/EP00/01392, filed on Feb. 21, 2000, having inventors Jürgen BRUNING and Eberhard LANG, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, and the references they are in turn cited in are hereby incorporated by reference as if set forth in their entirety herein. All of the documents cited herein, referred to in the immediately preceding sentence, include all of the patents, patent applications and publications cited anywhere in the present application. All of the references included herein as aforesaid include the corresponding equivalents published by the United States Patent and Trademark Office and elsewhere.

Some examples of automatic molding methods and apparatus, features of which may possibly be used or adapted for use in at least one embodiment of the present invention may be found in the following U.S. Pat. No. 3,957,103 issued to Fellows on May 18, 1976; U.S. Pat. No. 4,019,562 issued to Shiraiwa et al. on Apr. 26, 1977; U.S. Pat. No. 4,444,578 issued to Marroquin on Apr. 24, 1984; U.S. Pat. No. 4,470,836 issued to Delgadillo et al. on Sep. 11, 1984; U.S. Pat. No. 4,685,872 issued to Erlenbach on Aug. 11, 1987; U.S. Pat. No. 5,037,592 issued to Erlenbach on Aug. 6, 1991; U.S. Pat. No. 5,100,597 issued to Erlenbach on Mar. 31, 1992; and U.S. Pat. No. 5,891,483 issued to Miyajima on Apr. 6, 1999. These patents are hereby incorporated as if set forth in their entirety herein.

Some examples of control of molding machines, features of which may possibly be used or adapted for use in at least one embodiment of the present invention may be found in the following U.S. Pat. No. 5,820,797 issued to Hehl on Oct. 13, 1998; U.S. Pat. No. 5,906,778 issued to Arai on May 25, 1999; U.S. Pat. No. 5,914,077 issued to Fujita on Jun. 22, 1999; U.S. Pat. No. 6,015,515 issued to Fujita on Jan. 18, 2000; U.S. Pat. No. 6,048,440 issued to Baker on Apr. 11, 2000; U.S. Pat. No. 6,108,587 issued to Shearer et al. on Aug. 22, 2000; U.S. Pat. No. 6,163,130 issued to Neko et al. on Dec. 19, 2000; U.S. Pat. No. 6,179,600 issued to Siegrist et al. on Jan. 30, 2001; U.S. Pat. No. 6,192,299 issued to Kubota on Feb. 10, 2001; U.S. Pat. No. 6,257,859 issued to Koda et al. on Jul. 10, 2001; U.S. Pat. No. 6,258,303 issued to Hibi on Jul. 10, 2001; and U.S. Pat. No. 6,272,398 issued to Osborne et al. on Aug. 7, 2001. These patents are hereby incorporated by reference as if set forth in their entirety herein.

Some examples of operations such as steam handling, cross-flow operations, condensate extraction, reverse flow operations, cooling in molding machines, features of which may possibly be used or adapted for use in at least one embodiment of the present invention may be found in the following U.S. Pat. No. 3,963,816 issued to Smith on Jun. 15, 1976; U.S. Pat. No. 3,967,386 issued to Asfura on Jul. 6, 1976; U.S. Pat. No. 4,246,214 issued to Osswald on Jan. 20, 1981; U.S. Pat. No. 4,254,557 issued to Mayer et al. on Mar. 10, 1981; U.S. Pat. No. 4,255,166 issued to Gernand et al. on Mar. 10, 1981; U.S. Pat. No. 4,272,469 issued to Smith on Jun. 9, 1981; U.S. Pat. No. 4,343,771 issued to Edwards et al. on Aug. 10, 1982; U.S. Pat. No. 4,349,044 issued to Schirmer on Sep. 14, 1982; U.S. Pat. No. 4,382,757 issued to Roy et al. on May 10, 1983; U.S. Pat. No. 4,447,965 issued to Bray on May 15, 1984; U.S. Pat. No. 4,493,195 issued to Zalesak et al. on Jan. 15, 1985; U.S. Pat. No. 4,603,491 issued to Hengle et al. on Aug. 5, 1986; U.S. Pat. No. 4,617,878 issued to Paquet on Oct. 21, 1986; U.S. Pat. No. 4,828,913 issued to Kiss on May 9, 1989; U.S. Pat. No. 4,890,670 issued to Schiessl on Jan. 2, 1990; U.S. Pat. No. 4,900,503 issued to Hegler et al on Feb. 13, 1990; U.S. Pat. No. 4,934,918 issued to Outland on Jun. 19, 1990; U.S. Pat. No. 4,968,723 issued to Senda on Nov. 6, 1990; U.S. Pat. No. 4,976,900 issued to Tsutsumi on Dec. 11, 1990; U.S. Pat. No. 5,128,383 issued to Amano et al. on Jul. 7, 1992; U.S. Pat. No. 5,149,546 issued to Nelson on Sep. 22, 1992; U.S. Pat. No. 5,236,474 issued to Schofield et al. on Aug. 17, 1993; U.S. Pat. No. 5,271,886 issued to Collon on Dec. 21, 1993; U.S. Pat. No. 5,304,050 issued to Vismara on Apr. 19, 1994; U.S. Pat. No. 5,454,703 issued to Bishop on Oct. 3, 1995; U.S. Pat. No. 5,482,661 issued to Vismara on Jan. 9, 1996; U.S. Pat. No. 5,858,288 issued to Bullard on Jan. 12, 1999; U.S. Pat. No. 5,945,140 issued to Lin on Aug. 31, 1999; U.S. Pat. No. 6,063,325 issued to Nahill et al. on May 16, 2000; U.S. Pat. No. 6,139,789 issued to Neter et al. on Oct. 31, 2000; U.S. Pat. No. 6,168,416 issued to Galt on Jan. 2, 2001; U.S. Pat. No. 6,171,541 issued to Neter et al. on Jan. 9, 2001; and U.S. Pat. No. 6,223,541 issued to Farras on May 1, 2001. These patents are hereby incorporated by reference as if set forth in their entirety herein.

Examples of apparatus such as vacuum pumps, and slide valves, features of which may possibly be used or adapted for use in at least one embodiment of the present invention may be found in the following U.S. Pat. No. 5,301,712 issued to Treichel et al. on Apr. 12, 1994; U.S. Pat. No. 5,438,945 issued to Moody on Aug. 8, 1995; U.S. Pat. No. 5,577,707 issued to Brida on Nov. 26, 1996; U.S. Pat. No. 5,618,024 issued to Westenberg on Apr. 8, 1997; U.S. Pat. No. 5,771,928 issued to Zepic et al. on Jun. 30, 1998; U.S. Pat. No. 5,823,224 issued to Gomez on Oct. 20, 1998; U.S. Pat. No. 5,950,665 issued to Claus on Sep. 14, 1999; 6,135,709 issued to Stones on Oct. 24, 2000; U.S. Pat. No. 6,158,986 issued to Casaro et al. on Dec. 12, 2000; U.S. Pat. No. 6,171,068 issued to Greenberg on Jan. 9, 2001; U.S. Pat. No. 6,189,176 issued to Ivey et al. on Feb. 20, 2001; and U.S. Pat. No. 6,196,810 issued to Taniguchi et al. on Mar. 6, 2001. These patents are hereby incorporated by reference as if set forth in their entirety herein.

Some examples of mold liners and methods and apparatus therefor, features of which may possibly be used or adapted for use in at least one embodiment of the present invention may be found in the following U.S. Pat. No. 5,631,067 issued to Anaf et al. on May 20, 1997; U.S. Pat. No. 5,997,787 issued to Nelson et al. on Dec. 7, 1999; U.S. Pat. No. 6,025,282 issued to Dewaegheneire et al. on Feb. 15, 2000; and U.S. Pat. No. 6,149,748 issued to Boedinger et al. on Nov. 21, 2000. These patents are hereby incorporated by reference as if set forth in their entirety herein.

Some example of mold materials such as sintered materials and aluminum, and use in a mold, features of which may possibly be used or adapted for use in at least one embodiment of the present invention may be found in the following U.S. Pat. No. 4,073,857 issued to Arakawa on Feb. 14, 1978; U.S. Pat. No. 5,843,325 issued to Sou-San on Dec. 1, 1998; U.S. Pat. No. 5,976,457 issued to Amaya et al.

on Nov. 2, 1999; U.S. Pat. No. 5,997,603 issued to Noro et al. on Dec. 7, 1999; U.S. Pat. No. 6,103,153 issued to Park et al. on Aug. 15, 2000; U.S. Pat. No. 6,110,982 issued to Russick et al. on Aug. 29, 2000; and U.S. Pat. No. 6,174,168 issued to Dehoff et al. on Jan. 16, 2001. Aluminum molds for resin transfer molding (RTF) are also discussed by Odyssey Engineering on web-site elps.tripod.com/odysseyengineeringcadcamdesignandmanufacturing/id 13.html. The foregoing references are hereby incorporated by reference as if set forth in their entirety herein.

Some examples of wire mesh, features of which may possibly be used or adapted for use in at least one embodiment of the present invention may be found in the following U.S. Pat. No. 4,023,600 issued to Ritter et al. on May 17, 1977; U.S. Pat. No. 4,242,176 issued to Riel on Dec. 30, 1980; U.S. Pat. No. 4,549,741 issued to Usher et al. on Oct. 29, 1985; U.S. Pat. No. 4,605,046 issued tp Decoux on Aug. 12, 1986; U.S. Pat. No. 4,686,342 issued to Collier et al. on Aug. 11, 1987; U.S. Pat. No. 4,843,693 issued to Chisholm on Jul. 4, 1989; U.S. Pat. No. 5,205,877 issued to Collier et al. on Apr. 27, 1993; U.S. Pat. No. 5,312,508 issued to Chisholm on May 17, 1994; U.S. Pat. No. 5,370,797 issued to Cagle on Dec. 6, 1994; U.S. Pat. No. 5,398,816 issued to Senapati on Mar. 21, 1995; U.S. Pat. No. 5,542,548 issued to Senapati on Aug. 6, 1996, U.S. Pat. No. 5,613,185 issued to Marsden et al. Mar. 18, 1997; U.S. Pat. No. 5,915,566 issued to Senapati on Jun. 29, 1999; and U.S. Pat. No. 6,039,233 issued to Kalbach on Mar. 21, 2000. These patents are hereby incorporated by reference as if set forth in their entirety herein.

Some examples relating to mesh comprising carbon, features of which may possibly be used or adapted for use in at least one embodiment of the present invention may be found in the following U.S. Patents: U.S. Pat. No. 5,364,682 issued to Tanaka et al. on Nov. 15, 1994; and U.S. Pat. No. 5,851,588 issued to Uthoff, Jr. on Dec. 22, 1998. These patents are hereby incorporated by reference as if set forth in their entirety herein.

Some example of fabric mesh including non-woven fabric mesh, features of which may possibly be used or adapted for use in at least one embodiment of the present invention may be found in the following U.S. Pat. No. 4,233,350 issued to Shiflet on Nov. 11, 1980; U.S. Pat. No. 4,427,734 issued to Johnson on Jan. 24, 1984; U.S. Pat. No. 4,623,281 issued to Verbauwhede et al. on Nov. 18, 1986; U.S. Pat. No. 5,115,544 issued to Widen on May 26, 1992; U.S. Pat 5,275,743 issued to Miller et al. on Jan. 4, 1994; U.S. Pat. No. 5,421,376 issued to Sinha on Jun. 6, 1995; U.S. Pat. No. 5,651,853 issued to Wrigley et al. on Jul. 29, 1997; U.S. Pat. No. 5,679,441 issued to Saelens on Oct. 21, 1997; U.S. Pat. No. 5,687,775 issued to Thompson et al. on Nov. 18, 1997; U.S. Pat. No. 5,755,946 issued to Ferronato on May 26, 1998; U.S. Pat. No. 5,893,191 issued to Schneider et al on Apr. 13, 1999; U.S. Pat. No. 6,054,178 issued to Howells on Apr. 25, 2000; U.S. Pat. No. 6,033,509 issued to and U.S. Pat. No. 6,240,608 issued to Paquin et al. Jun. 5, 2001. These patents are hereby incorporated by reference as if set forth in their entirety herein.

Some example of offset ply winding, features of which may possible be used or adapted for use in at least one embodiment of the present invention may be found in the following U.S. Pat. No. 4,762,268 issued to Doble on Aug. 9, 1988; U.S. Pat. No. 5,192,330 issued to Chang et al. on Mar. 9, 1993; U.S. Pat. No. 5,718,784 issued to Takamatsu on Feb. 17, 1998; and U.S. Pat. No. 6,217,683 issued to Balzer et al. on Apr. 17, 2001. These patents are hereby incorporated by reference as if set forth in their entirety herein.

Some examples of welding wire mesh, features of which may possibly be used or adapted for use in at least one embodiment of the present invention may be found in the following U.S. Pat. No. 4,021,634 issued to Gott et al. on May 3, 1977; U.S. Pat. No. 4,064,385 issued to Gott et al. on Dec. 20, 1977; U.S. Pat. No. 4,605,046 issued to Decoux on Aug. 12, 1986; U.S. Pat. No. 4,686,342 issued to Collier et al. on Aug. 11, 1987; and U.S. Pat. No. 5,672,283 issued to Wall on Sep. 30, 1997. These patents are hereby incorporated by reference as if set forth in their entirety herein.

Some examples of induction welding, features of which may possibly be used or adapted for use in at least one embodiment of the present invention may be found in the following U.S. Pat. No. 4,197,441 issued to Rudd on Apr. 8, 1980; U.S. Pat. No. 4,268,736 issued to Cuvelier on May 19, 1981; U.S. Pat. No. 4,947,462 issued to Moe on Aug. 7, 1990; U.S. Pat. No. 5,001,319 issued to Holmstrom on Mar. 19, 1991; U.S. Pat. No. 5,047,605 issued to Ogden on Sep. 10, 1991; and U.S. Pat. No. 5,260,535 issued to Holmstrom et al. on Nov. 9, 1993. These patents are hereby incorporated by reference as if set forth in their entirety herein.

Some examples of adhesive fastening of mesh, features of which may possibly be used or adapted for use in at least one embodiment of the present invention may be found in the following U.S. Patents: U.S. Pat. No. 4,428,650 issued to Murro on Feb. 3, 1981; U.S. Pat. No. 5,312,508 issued to Chisholm on May 17, 1994; U.S. Pat. No. 5,940,687 issued to Davis et al. on Aug. 17, 1999; and U.S. Pat. No. 6,043,110 issued to Davis et al. on Mar. 28, 2000. These patents are hereby incorporated by reference as if set forth in their entirety herein.

Some examples of sintering wire mesh, features of which may possibly be used or adapted for use in at least one embodiment of the present invention may be found in the following U.S. Pat. No. 4,083,905 issued to Insley et al. on Apr. 11, 1978; U.S. Pat. No. 4,842,517 issued to Kawahara et al. on Jun. 27, 1989; U.S. Pat. No. 5,167,502 issued to Kawahara et al. on Dec. 1, 1992; and U.S. Pat. No. 5,613,185 issued to Marsden et al. on Mar. 18, 1997. These patents are hereby incorporated by reference as if set forth in their entirety herein.

Some examples of fastening mesh, features of which may possibly be used or adapted for use in at least one embodiment of the present invention may be found in the following U.S. Pat. No. 4,548,202 issued to Duncan on Oct. 22, 1985; U.S. Pat. No. 5,133,463 issued to Merl on Jul. 28, 1992; U.S. Pat. No. 5,255,898 issued to Cacicedo on Oct. 26, 1992; and U.S. Pat. No. 6,039,233 issued to Kalbach on Mar. 21, 2000. These patents are hereby incorporated by reference as if set forth in their entirety herein.

Some examples of pressing mesh, features of which may possibly be used or adapted for use in at least one embodiment of the present invention may be found in the following U.S. Pat. No. 4,296,166 issued to Ogino et al. on Oct. 20, 1981; U.S. Pat. No. 4,411,948 issued to Ogino et al on Oct. 25, 1983; U.S. Pat. No. 4,864,095 issued to Yamashita et al. on Sep. 5, 1989; U.S. Pat. No. 5,232,544 issued to Sumi on Aug. 3, 1993; U.S. Pat. No. 6,033,509 issued to Miyamoto et al. on Mar. 7, 2000; and U.S. Pat. No. 6,091,193 issued to Kuwamoto et al. on Jul. 18, 2000. These patents are hereby incorporated by reference as if set forth in their entirety herein.

Some examples of crimping mesh, features of which may possibly be used or adapted for use in at least one embodiment of the present invention may be found in the following U.S. Pat. No. 4,489,125 issued to Gagnon on Dec. 18, 1984; U.S. Pat. No. 4,698,504 issued to Van Pelt on Oct. 6, 1987;

U.S. Pat. No. 4,843,693 issued to Chisholm on Jul. 4, 1989; and U.S. Pat. No. 4,869,061 issued to Ensminger et al. on Sep. 26, 1989. These patents are hereby incorporated by reference as if set forth in their entirety herein.

Some examples of mesh deformation operations, features of which may possibly be used or adapted for use in at least one embodiment of the present invention may be found in the following U.S. Pat. No. 5,205,877 issued to Collier et al. on Apr. 27, 1993; U.S. Pat. No. 5,660,938 issued to Sato et al. on Aug. 26, 1997; U.S. Pat. No. 5,716,718 issued to Lai on Feb. 10, 1998; U.S. Pat. No. 6,004,077 issued to Saab on Dec. 21, 1999; U.S. Pat. No. 6,056,479 issued to Goda et al. on Mar. 20, 2001; and U.S. Pat. No. 6,247,871 issued to Nickel et al. on Jun. 19, 2001. These patents are hereby incorporated by reference as if set forth in their entirety herein.

Some examples of heat treatment of mesh, features of which may possibly be used or adapted for use in at least one embodiment of the present invention may be found in the following U.S. Pat. No. 4,513,149 issued to Gray et al. on Apr. 23, 1985; U.S. Pat. No. 4,615,671 issued to Bernal on Oct. 7, 1986; U.S. Pat. No. 4,741,920 issued to Ueno et al. on May 3, 1988; U.S. Pat. No. 5,205,877 issued to Collier et al. on Apr. 27, 1993; and U.S. Pat. No. 5,294,270 issued to Fenical on Mar. 15, 1994. These patents are hereby incorporated by reference as if set forth in their entirety herein.

Some examples of fine mesh materials, features of which my possibly be used or adapted for use in at least one possible embodiment of the present invention may be found in the following U.S. Pat. No. 4,655,797 issued to Inoitakis et al. Apr. 7, 1987; U.S. Pat. No. 5,115,544 issued to Widen on May 26, 1992; U.S. Pat. No. 5,492,143 issued to Cooper et al. on Feb. 20, 1996; U.S. Pat. No. 5,662,797 issued to Varrassi on Sep. 2, 1997; and U.S. Pat. No. 6,089,051 issued to Gorywoda et al. on Jul. 18, 2000. These patents are hereby incorporated by reference as if set forth in their entirety herein.

Some examples of fine mesh fabric and woven fabric materials, features of which my possibly be used or adapted for use in at least one possible embodiment of the present invention may be found in the following U.S. Pat. No. 4,155,381 issued to Amengual on May 22, 1979; U.S. Pat. No. 6,010,652 issued to Yoshida on Jan. 4, 2000; U.S. Pat. No. 6,040,252 issued to Ootuka et al. on Mar. 21, 2000; U.S. Pat. No. 6,048,808 issued to Kurihara et al. on Apr. 11, 2000; U.S. Pat. No. 6,069,097 issued to Suzuki et al. on May 30, 2000; U.S. Pat. No. 6,074,966 issued to Zlatkus on Jun. 13, 2000; U.S. Pat. No. 6,087,549 issued to Flick on Jul. 11, 2000; U.S. Pat. No. 6,087,551 issued to Pereira on Jul. 11, 2000; U.S. Pat. No. 6,090,730 issued to Fujiwara et al. on Jul. 18, 2000; U.S. Pat. No. 6,110,847 issued to Yamamoto et al. on Aug. 29, 2000; U.S. Pat. No. 6,124,001 issued to Sugita et al. on Sep. 26, 2000; U.S. Pat. No. 6,140,259 issued to Ushida et al. on Oct. 31, 2000; U.S. Pat. No. 6,153,545 issued to LaLonde et al. on Nov. 28, 2000; U.S. Pat. No. 6,183,684 issued to Lu on Feb. 6, 2001; U.S. Pat. No. 6,207,601 issued to Maurer et al. on Mar. 27, 2001; U.S. Pat. No. 6,227,255 issued to Osterberg et al. on May 8, 2001; and U.S. Pat. No. 6,255,237 issued to Sakamoto et al. on Jul. 3, 2001. These patents are hereby incorporated by reference as if set forth in their entirety herein.

Some examples of plastic beads, features of which may possibly be used or adapted for use in at least one embodiment of the present invention may be found in the following U.S. Pat. No. 4,952,350 issued to Duffy on Aug. 28, 1990; U.S. Pat. No. 5,480,599 issued to Leven et al. on Jan. 2, 1996; U.S. Pat. No. 5,605,937 issued to Knaus on Feb. 25, 1997; U.S. Pat. No. 5,665,285 issued to Hattori et al. on Sep. 9, 1997; U.S. Pat. No. 5,763,498 issued to Knaus on Jun. 9, 1998; U.S. Pat. No. 5,861,119 issued to Merser on Jan. 19, 1999; and U.S. Pat. No. 6,265,463 issued to August et al. on Jul. 24, 2001. These patents are hereby incorporated by reference as if set forth in their entirety herein.

Some examples of polyethylene film, features of which may possibly be used or adapted for use in at least one embodiment of the present invention may be found in the following U.S. Pat. No. 5,681,523 issued to Cobler et al. on Oct. 28, 1997; U.S. Pat. No. 5,744,551 issued to Kupperblatt et al. on Apr. 28, 1998; U.S. Pat. No. 5,916,692 issued to Brambila on Jun. 29, 1999; U.S. Pat. No. 6,147,167 issued to Mack et al. on Nov. 14, 2000; and U.S. Pat. No. 6,248,831 issued to Maheshwari et al. on Jun. 19, 2001. These patents are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described herein above in the context of the preferred embodiments is not to be taken as limited to all of the provided details thereof, since modifications and variations thereof may be made without departing from the spirit and scope of the invention.

What is claimed is:

1. A method for producing a product comprising plastic foam in an automatic molding machine with a mold cavity in conformity with the configuration of the product, said method comprising the steps of:

provided a woven fabric on at least one surface of said mold cavity, said woven fabric comprising a fabric having a plurality of plies, with a fine-mesh woven fabric ply that faces the interior of said mold cavity upon assembly and a coarse-mesh woven fabric ply that is disposed adjacent said at least one surface of said mold cavity and beneath said fine-mesh woven ply upon assembly to support said fine-mesh woven ply;

introducing beads comprising plastic foam into said mold cavity;

contacting said beads with a gaseous heat transfer medium, such as superheated steam;

said step of contacting comprising:
introducing said gaseous heat transfer medium into the mold cavity;
flowing said gaseous heat transfer medium along a first surface of said mold cavity; and
removing said gaseous heat transfer medium along a second surface of said mold cavity; and removing the product from the mold.

2. A method for operating an automatic molding machine for producing plastic foam products from beads, with a mold cavity into which the beads are fed and subjected to a gaseous heat transfer medium, in particular superheated steam, the gaseous heat transfer medium entering the mold cavity from a surface of the automatic molding machine and leaving it again through another surface of the automatic molding machine, and a woven fabric being provided on at least one surface of the automatic molding machine, characterized by the use of a multi-ply woven fabric with a fine-mesh woven fabric ply on the foam side and a coarse-mesh woven fabric ply arranged under the latter as a supporting structure.

3. The method according to claim 2, characterized by the production of smooth surfaces on the molding.

4. The method according to claim 3, characterized by the use of a woven fabric ply on the foam side with a mesh width which is less than half the diameter of the beads and/or by the use of a woven fabric structure with at least one low-mass woven fabric ply on the foam side and/or a condensate discharge.

5. The method according to claim 4, characterized by condensate extraction.

6. The method according to claim 5, characterized by the use of a steam chamber in the exhaust-steam section and the application of a vacuum to the steam chamber.

7. The method according to claim 6, characterized by the use of a woven fabric ply with a mesh width of 0.001 to 0.5 millimeters, preferably 0.005 to 0.2 millimeters, in the case of beads with a diameter of 3 to 5 millimeters.

8. The method according to claim 7, characterized by the production of easy-clean surfaces for the transportation and/or storage of foodstuffs and/or for the processing of moldings by laminating of thin films.

9. The method according to claim 2, characterized by the use of woven fabrics with a customary thread or wire thickness derived from the mesh width or a thickness which is equal to or less than ten times, preferably equal to or less than five times, the mesh width or even equal to or less than the mesh width.

10. The method according to claim 2, characterized by the molding being acted upon with a coolant through the woven fabric after the application of steam has ended.

11. The method according to claim 10, characterized by the use of cooling air and/or cooling water as the coolant.

12. The method according to claim 11, characterized by one of (i.), (ii.), (iii.), and (iv.):
  (i.) cross-flow steam application;
  (ii.) steam feed openings and/or exhaust steam openings in the various walls of the automatic molding machine and inlet and outlet lines with slide valves;
  (iii.) flow reversal when blowing free the woven fabric ply; and
  (iv.) blowing free after one or more cycles irrespective of the soiling or blowing free after soiling.

13. The method according to claim 12, characterized by reversal of the flow of steam with and/or without the automatic molding machine being filled.

14. The method according to claim 13, characterized by the use of a woven supporting structure with a mesh width which is 1.5 to 20 times that of the woven fabric structure on the foam side, and with a thread or wire thickness which is 1.5 to 20 times that of the woven fabric structure on the foam side.

15. The method according to claim 14, characterized by the use of a woven supporting structure, the mesh width of which is at least equal to the mesh width of the woven fabric structure on the foam side plus 2.5 times the thread or wire thickness of the woven fabric structure on the foam side.

16. The method according to claim 15, characterized by the use of a woven fabric structure with an offset ply between the woven fabric plies.

17. The method according to claim 16, characterized by the use of woven fabric structures, the plies of which are completely or partially connected to one another and/or to the associated wall of the automatic molding machine by
  a) welding; and/or
  b) adhesive bonding; and/or
  c) sintering; and/or
  d) fastening element; and/or
  e) pressing and/or crimping.

18. The method according to claim 17, characterized by one of (i.), (ii.), (iii.), (iv.), and (v.):
  (i.) induction welding;
  (ii.) wires made of steel and/or threads made of carbon fibers;
  (iii.) the use of woven fabric structures with a thickness of up to 15 millimeters;
  (iv.) the use of a woven fabric structure with a thickness of 3 to 5 millimeters; and
  (v.) by individual or group or joint deformation of all woven fabric plies to adapt them to the walls of the automatic molding machine.

19. The method according to claim 18, characterized by one of (i.), (ii.), (iii.), and (iv.):
  (i.) the pressing of the woven fabric plies;
  (ii.) the use of a protective film and/or protective panel between the woven fabric ply and the pressing tool and/or the use of at least surface-hardened pressing tools;
  (iii.) the use of a protective film on the woven fabric ply on the foam side with a thickness approximately the same as that of the remainder of the material to be deformed; and
  (iv.) the use of protective films and/or panels made of PE and/or PP.

20. The method according to claim 19, characterized by one of (i.), (ii.), (iii.), (iv.), and (v.):
  (i.) heat treatment of metallic woven fabric plies before deformation and/or after connection of the woven fabric plies;
  (ii.) use of one or more filter plies on the woven fabric and/or the use of woven fabrics with one or more included filter plies;
  (iii.) use of one-piece or multi-piece linings of mold cavities and/or completely or partially self-supporting linings;
  (iv.) use of porous, gas-permeable and/or water-permeable walls for the automatic molding machine; and
  (v.) use of molding walls made of aluminum and/or sintered material.

* * * * *